(12) United States Patent
Hirose

(10) Patent No.: US 10,763,737 B2
(45) Date of Patent: Sep. 1, 2020

(54) WAVEFORM SHAPING CIRCUIT, SEMICONDUCTOR DEVICE, AND SWITCHING POWER SUPPLY DEVICE

(71) Applicant: FUJITSU LIMITED, Kawasaki-shi, Kanagawa (JP)

(72) Inventor: Tatsuya Hirose, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/248,876

(22) Filed: Jan. 16, 2019

(65) Prior Publication Data

US 2019/0296632 A1 Sep. 26, 2019

(30) Foreign Application Priority Data

Mar. 20, 2018 (JP) .................. 2018-053400

(51) Int. Cl.
*H02M 1/08* (2006.01)
*H02M 1/32* (2007.01)
*H02M 1/42* (2007.01)
*H02M 3/335* (2006.01)

(52) U.S. Cl.
CPC .............. *H02M 1/08* (2013.01); *H02M 1/32* (2013.01); *H02M 1/4208* (2013.01); *H02M 3/33592* (2013.01)

(58) Field of Classification Search
CPC ........ H02M 1/08; H02M 1/082; H02M 1/088; H02M 1/32; H02M 2001/0029; H02M 3/156; H02M 3/157; H02M 3/158; H02M 3/335–33592; H02M 2003/1566
See application file for complete search history.

(56) References Cited

U.S. PATENT DOCUMENTS

| 7,990,205 | B2 * | 8/2011 | Jung | ............... | H02M 3/156 |
| | | | | | 327/536 |
| 2011/0234183 | A1 * | 9/2011 | Noon | ............... | H02M 3/156 |
| | | | | | 323/271 |
| 2017/0005649 | A1 * | 1/2017 | Kondo | ............... | H02M 3/158 |
| 2018/0062510 | A1 * | 3/2018 | Trescases | ............ | H02M 3/156 |
| 2018/0262192 | A1 * | 9/2018 | Godycki | ............ | H03F 3/2171 |
| 2019/0267985 | A1 * | 8/2019 | Li | ............... | H03K 17/162 |

FOREIGN PATENT DOCUMENTS

| JP | 05-19879 | 1/1993 |
| JP | 2006-87215 | 3/2006 |

* cited by examiner

*Primary Examiner* — Thienvu V Tran
*Assistant Examiner* — Shahzeb K Ahmad
(74) *Attorney, Agent, or Firm* — Fujitsu Patent Center

(57) ABSTRACT

A waveform shaping circuit includes a first variable gate voltage circuit that controls a minimum voltage of a pulse voltage based on a drain current or a source current of a field effect transistor, the pulse voltage having a positive or negative value and being applied to a gate of the field effect transistor, and a second variable gate voltage circuit that controls a maximum voltage of the pulse voltage based on the drain current or the source current.

4 Claims, 12 Drawing Sheets

US 10,763,737 B2

WAVEFORM SHAPING CIRCUIT, SEMICONDUCTOR DEVICE, AND SWITCHING POWER SUPPLY DEVICE

CROSS-REFERENCE TO RELATED APPLICATION

This application is based upon and claims the benefit of priority of the prior Japanese Patent Application No. 2018-53400, filed on Mar. 20, 2018, the entire contents of which are incorporated herein by reference.

FIELD

The embodiments discussed herein are related to a waveform shaping circuit, a semiconductor device, and a switching power supply device.

BACKGROUND

A field effect transistor (FET) is used in a switching power supply device which is used as an alternating current (AC)/direct current (DC) converter or a DC/DC converter, and in a semiconductor device such as an amplifier.

For instance, a silicon (Si)-metal-oxide-semiconductor (MOS) FET is widely used in an FET. In recent years, a high electron mobility transistor (HEMT) has been developed. As a typical HEMT, a GaN-HEMT is known which uses a gallium nitride (GaN)-based compound semiconductor having a low on-resistance.

Meanwhile, the current of an FET varies with the ambient temperature. When the current of an FET varies, a malfunction of a circuit which uses the current may be caused. The threshold voltage of an FET also varies with the ambient temperature. In a method of reducing temperature rise of an FET, the temperature of the FET is detected by a thermocouple, and when the temperature of the FET increases, the volume of air applied to heat radiating fins installed in a device including the FET is increased.

In a switching power supply device, control is performed to minimize the variation in the output voltage and the current of an FET by changing the duty ratio of a gate voltage (pulse voltage) of the FET using a control integrated circuit (IC) according to the output voltage and the current of the FET.

The change of the duty ratio of the gate voltage as described above is effective when the variation in the output voltage of a switching power supply device is reduced. However, for a variation in the current of the FET, the gate voltage outputted from the control IC has uniform maximum voltage and minimum voltage, thus even when the duty ratio is changed, the effect of reducing the variation in the current is small.

The followings are reference documents.
[Document 1] Japanese Laid-open Patent Publication No. 2006-87215 and
[Document 2] Japanese Laid-open Patent Publication No. 05-19879.

SUMMARY

According to an aspect of the embodiments, a waveform shaping circuit includes a first variable gate voltage circuit that controls a minimum voltage of a pulse voltage based on a drain current or a source current of a field effect transistor, the pulse voltage having a positive or negative value and being applied to a gate of the field effect transistor, and a second variable gate voltage circuit that controls a maximum voltage of the pulse voltage based on the drain current or the source current.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Hereinafter, an embodiment of the present disclosure will be described with reference to the drawings.

First Embodiment

Figure 1:
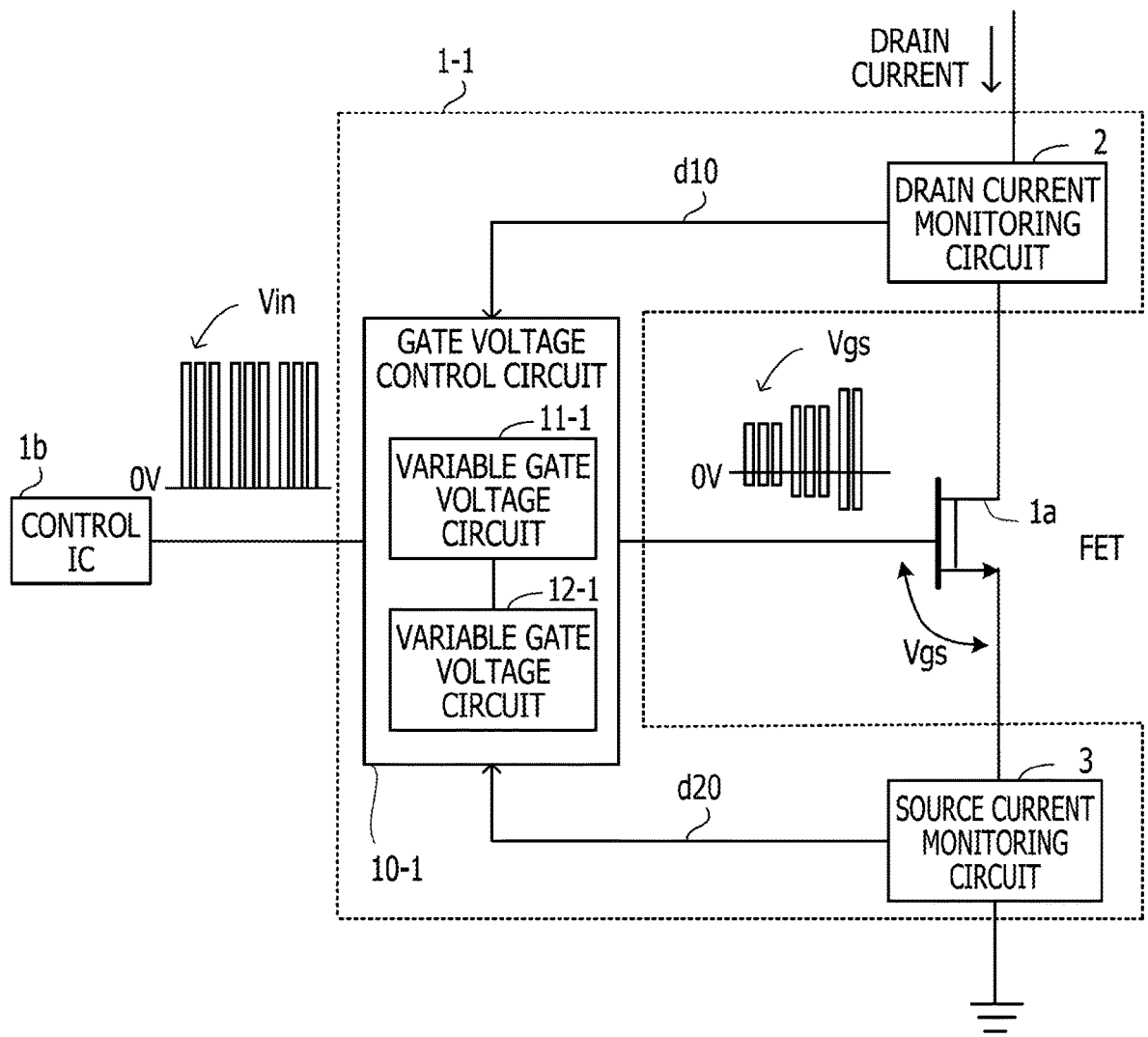
FIG. 1 is a diagram illustrating an example of a waveform shaping circuit of a first embodiment.

FIG. 1 is a diagram illustrating an example of a waveform shaping circuit of a first embodiment. A waveform shaping circuit 1-1 performs variable control of the level of a maximum value or a minimum value of the gate voltage (pulse voltage) applied to the gate terminal of the FET 1a while performing waveform shaping of the gate voltage according to a change in the drain current or the source current of FET 1a.

The waveform shaping circuit 1-1 has a gate voltage control circuit 10-1 which includes variable gate voltage circuits 11-1, 12-1. Although the example of FIG. 1 illustrates that the waveform shaping circuit 1-1 includes a drain current monitoring circuit 2 and a source current monitoring circuit 3, it is sufficient that the waveform shaping circuit 1-1 include one of the drain current monitoring circuit 2 and the source current monitoring circuit 3.

Although the example illustrated in FIG. 1 depicts that the drain current monitoring circuit 2 and the source current monitoring circuit 3 are included in the waveform shaping circuit 1-1, the drain current monitoring circuit 2 and the source current monitoring circuit 3 may not be included in the waveform shaping circuit 1-1.

The drain current monitoring circuit 2 monitors the drain current of the FET 1a, and outputs a result of monitoring. For instance, the drain current monitoring circuit 2 converts the monitored drain current into a voltage, and outputs a detected current signal d10.

The source current monitoring circuit 3 monitors the source current of the FET 1a, and outputs a result of monitoring. For instance, the source current monitoring circuit 3 converts the monitored source current into a voltage, and outputs a detected current signal d20.

In the example of FIG. 1, the FET 1a is an n-channel FET, for instance, a GaN-HEMT. The FET 1a may be a compound FET such as Si-MOSFET, GaAs (gallium arsenide)-MOSFET.

The gate voltage control circuit 10-1 receives an input voltage Vin having a uniform level of maximum voltage and minimum voltage. The input voltage Vin is outputted from a control IC 1b of a switching power supply device, for instance. The variable gate voltage circuit 11-1 controls the minimum voltage of a gate voltage Vgs having a positive or a negative value, which is generated from the input voltage Vin based on the drain current or the source current of the FET 1a, and is applied to the gate terminal of the FET 1a.

The variable gate voltage circuit 12-1 controls the maximum voltage of the gate voltage Vgs based on the drain current or the source current of the FET 1a. For instance, when the drain current or the source current decreases, in the gate voltage control circuit 10-1, the variable gate voltage circuit 11-1 causes the minimum voltage of the gate voltage Vgs to drop, and the variable gate voltage circuit 12-1 causes the maximum voltage of the gate voltage Vgs to rise.

Figure 2:
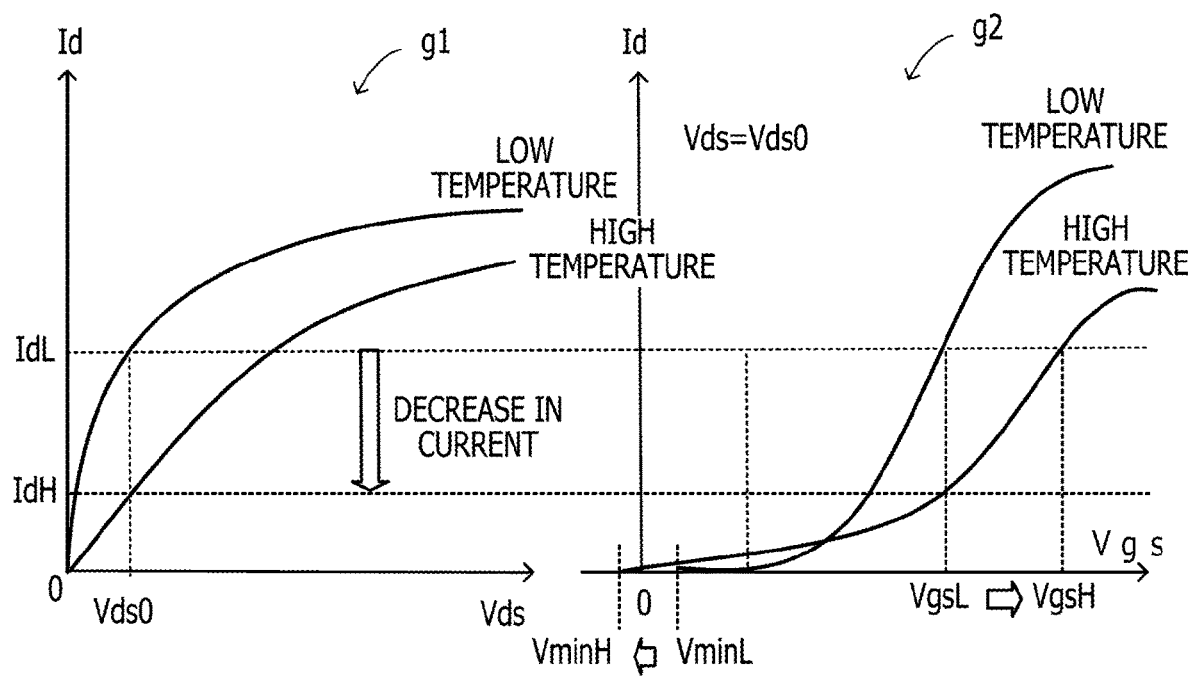
FIG. 2 is a graph illustrating an example of a current voltage characteristics of FET.

When detecting a current change in the FET 1a, the waveform shaping circuit 1-1 only have to detect a change in one of the drain current and the source current. FIG. 2 is a graph illustrating an example of a current voltage characteristics of the FET. Waveform graphs g1, g2 are waveforms respectively illustrating the drain voltage dependence and the gate voltage dependence of the drain current Id of the FET 1a at the time of low temperature and high temperature.

The vertical axis of the waveform graph g1 indicates drain current Id, and the horizontal axis indicates drain voltage Vds. The vertical axis of the waveform graph g2 indicates drain current Id, and the horizontal axis indicates gate voltage Vgs. In the waveform graph g1, when the drain voltage Vds is Vds0, the drain current Id at the time of low temperature is IdL, and the drain current Id at the time of high temperature is IdH. Similarly, in the waveform graph g2 (the drain voltage Vds=Vds0), when the gate voltage Vgs is VgsL, the drain current Id at the time of low temperature is IdL, and the drain current Id at the time of high temperature is IdH.

In this manner, the drain current Id of the FET 1a varies with the ambient temperature. In this example, it is seen that when the temperature changes from a low temperature to a high temperature, the drain current Id of the FET 1a decreases (FIG. 2 illustrates a change in the drain current Id, and the source current similarly varies with the ambient temperatures).

In general, the drain current Id for a gate voltage Vgs near a threshold voltage increases as the ambient temperature increases, and the drain current Id for a gate voltage Vgs sufficiently higher than a threshold voltage decreases as the ambient temperature increases. As illustrated in the waveform graph g2, the threshold voltage itself decreases (has a negative value in the example of FIG. 2) as the ambient temperature increases.

When detecting a decrease in the drain current Id of the FET 1a, the waveform shaping circuit 1-1 causes the minimum voltage of the gate voltage Vgs to drop, and causes the maximum voltage of the gate voltage Vgs to rise, for instance. For instance, when the maximum voltage of the gate voltage Vgs is VgsL, and the drain current Id is IdL, the ambient temperature increases, and when the drain current Id decreases to IdH, the variable gate voltage circuit 12-1 causes the maximum value of the gate voltage Vgs to rise to VgsH. Thus, as illustrated in FIG. 2, the amount of decrease in the drain current Id may be recovered, and it is possible to reduce the variation in the drain current Id.

On the other hand, when the minimum voltage of the gate voltage Vgs is VminL, and the drain current Id is 0, the ambient temperature increases, and when a threshold voltage of the FET 1a decreases, the drain current Id increases. Thus, the variable gate voltage circuit 11-1 causes the minimum voltage of gate voltage Vgs to drop to VminH. Thus, as illustrated in FIG. 2, the amount of increase in the drain current Id may be reduced, and it is possible to reduce the variation in the drain current Id.

Even when the drain current Id of the FET 1a is decreased due to temperature change from a low temperature to a high temperature caused by the control described above, it is possible for the waveform shaping circuit 1-1 to reduce the variation in the drain current Id. The control when the temperature changes from a low temperature to a high temperature has been described above. However, even when the temperature changes from a high temperature to a low temperature, similar level variable control is performed to reduce the variation in the drain current Id.

In this manner, the waveform shaping circuit 1-1 controls the minimum voltage and the maximum voltage of the gate voltage Vgs based on the drain current Id of the FET 1a. Thus, it is possible to reduce the variation in the drain current Id of the FET 1a due to the ambient temperature. The waveform shaping circuit 1-1 achieves a similar effect by controlling the minimum voltage or the maximum voltage of the gate voltage Vgs based on the source of the FET 1a.

Even when the threshold voltage of the FET 1a decreases due to an increase in the ambient temperature, in response to detection of a decrease in the drain current or the source current by the waveform shaping circuit 1-1, it is possible to cause the minimum voltage of the pulse voltage Vin to drop, and to set the minimum voltage of the gate voltage Vgs to a threshold voltage or lower. It is possible for the waveform shaping circuit 1-1 to set the minimum voltage of the gate voltage Vgs to a negative voltage as illustrated in FIG. 1, for instance. Consequently, it is possible to reliably turn off the FET 1a.

Although a description has been given above under the assumption that the FET 1a is n-channel FET, the FET 1a may be a p-channel FET. In this case, control of the minimum voltage and the maximum voltage of the gate voltage Vgs may be performed in a converse manner.

Second Embodiment

Figure 3:
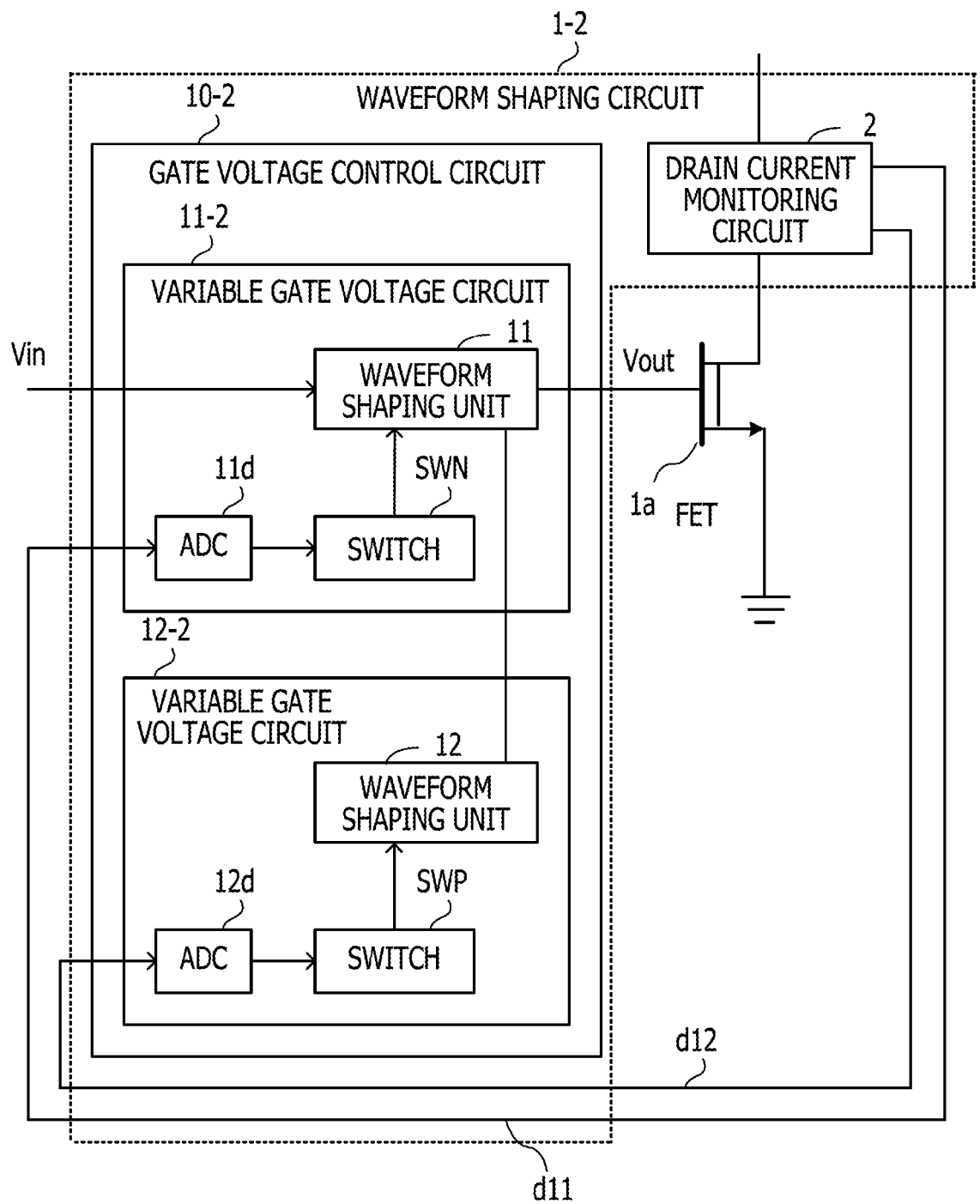
FIG. 3 is a diagram illustrating an example of a waveform shaping circuit of a second embodiment.

FIG. 3 is a diagram illustrating an example of a waveform shaping circuit of a second embodiment. The same component as in the waveform shaping circuit 1-1 of the first embodiment illustrated in FIG. 1 is labeled with the same symbol. In the second embodiment, the waveform shaping circuit includes a drain current monitoring circuit 2 that monitors the drain current, and performs level control of the gate voltage.

The waveform shaping circuit 1-2 has a gate voltage control circuit 10-2 and a drain current monitoring circuit 2. The gate voltage control circuit 10-2 includes a variable gate voltage circuits 11-2, 12-2.

The variable gate voltage circuit 11-2 includes a waveform shaping unit 11, a switch SWN, and an AC/DC converter (ADC) 11d. The variable gate voltage circuit 12-2 includes a waveform shaping unit 12, a switch SWP, and an ADC 12d. The ADCs 11d, 12d may be installed in the drain current monitoring circuit 2.

The ADC 11d is an example of a switch control circuit that controls the ON/OFF of the switch SWN. The ADC 11d generates and outputs a digital signal for performing ON/OFF control of the switch SWN, based on a detected current signal d11 outputted from the drain current monitoring circuit 2.

The ADC 12d is an example of a switch control circuit that controls the ON/OFF of the switch SWP. The ADC 12d generates and outputs a digital signal for performing ON/OFF control of the switch SWP, based on a detected current signal d12 outputted from the drain current monitoring circuit 2.

The switches SWN, SWP perform switching based on digital signals outputted by the ADCs 11d, 12d. The waveform shaping units 11, 12 determine a predetermined voltage range of an output voltage Vout (gate voltage Vgs of the FET 1a) based on the switching of the switches SWN, SWP.

Figure 4:
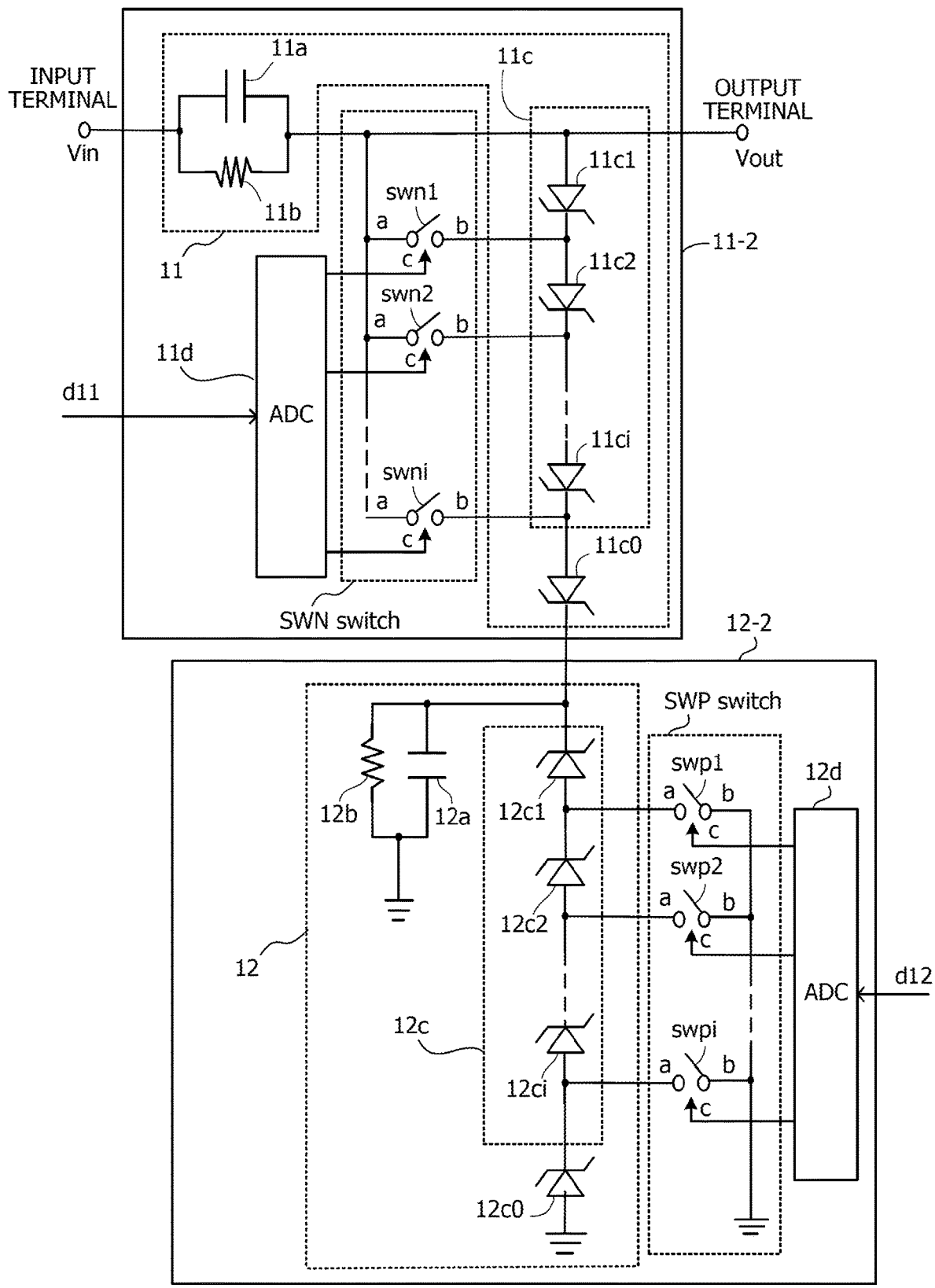
FIG. 4 is a diagram illustrating an example of a variable gate voltage circuit.

FIG. 4 is a diagram illustrating an example of a variable gate voltage circuit. In the variable gate voltage circuit 11-2, the waveform shaping unit 11 includes a capacitor 11a, a resistive element 11b, a Zener diode 11c0, and a Zener diode group 11c. The Zener diode group 11c includes Zener diodes 11c1, ..., 11ci. The switch SWN includes switches swn1, swn2, ..., swni. The Zener diode group 11c may consist of one Zener diode.

In the variable gate voltage circuit 12-2, the waveform shaping unit 12 includes a capacitor 12a, a resistive element 12b, a Zener diode 12c0, and a Zener diode group 12c. The Zener diode group 12c includes Zener diodes 12c1, ..., 12ci. The switch SWP includes switches swp1, swp2, ..., swpi. The Zener diode group 12c may consist of one Zener diode.

The connection relationship between the circuit elements is as follows.

One end of the capacitor 11a is connected to the input terminal of the variable gate voltage circuit 11-2 and one end of the resistive element 11b. The other end of the capacitor 11a is connected to the other of the resistive element 11b, a terminal a of the switches swn1, swn2, ..., swni, the anode of the Zener diode 11c1, and the output terminal of the variable gate voltage circuit 11-2.

The Zener diodes 11c1, ..., 11ci are connected in series, and the cathodes of the Zener diodes 11c1, ..., 11ci are connected to the terminals b of the switches swn1, swn2, ..., swni, respectively.

For instance, the cathode of the Zener diode 11c1 is connected to the terminal b of the switch swn1, and the anode of the Zener diode 11c2. The cathode of the Zener diode 11c2 is connected to the terminal b of the switch swn2, and the anode of the Zener diode 11c3 (not illustrated). The cathode of the Zener diode 11ci is connected to the terminal b of the switch swni, and the anode of the Zener diode 11c0.

The detected current signal d11 is inputted to the input terminal of the ADC 11d. The output terminal of the ADC 11d is connected to terminals c (common terminals for switch opening and closing control) of the switches swn1, ..., swni.

The cathode of the Zener diode 11c0 is connected to one end of the capacitor 12a, one end of the resistive element 12b, and the cathode of the Zener diode 12c1. The other end of the capacitor 12a and the other end of the resistive element 12b are connected to a component (hereinafter referred to as a GND) which serves as a reference potential.

The Zener diodes 12c1, ..., 12ci are connected in series, and the anodes of the Zener diodes 12c1, ..., 12ci are connected to the terminals a of the switches swp1, ..., swpi, respectively.

For instance, the anode of the Zener diode 12c1 is connected to the terminal a of the switch swp1, and the cathode of the Zener diode 12c2. The anode of the Zener diode 12c2 is connected to the terminal a of the switch swp2, and the cathode of the Zener diode 12c3 (not illustrated). The anode of the Zener diode 12ci is connected to the terminal a of the switch swpi, and the cathode of the Zener diode 12c0. The anode of the Zener diode 12c0 is connected to the GND.

The detected current signal d12 is inputted to the input terminal of the ADC 12d. The output terminal of the ADC 12d is connected to terminals c (common terminals for switch opening and closing control) of the switches swp1, ..., swpi. Terminals b of the switches swp1, ..., swpi are connected to the GND.

The output terminal of the variable gate voltage circuit 11-2 serves as the output terminal of the waveform shaping circuit 1-2, and is electrically connected to the gate terminal of the FET 1a.

In the variable gate voltage circuit 11-2 as illustrated in FIG. 4, the Zener diode group 11c is connected in forward bias for the input, and determines the minimum voltage of the output voltage Vout (gate voltage Vgs of the FET 1a).

In the waveform shaping circuit 1-2 like this, when the input voltage Vin, which is a positive pulse voltage, is inputted to the input terminal and Vin>0, a current flows through the parallel circuit of the capacitor 11a and the resistive element 11b. An electric charge is induced in the parallel circuit of the capacitor 12a and the resistive element 12b by the Zener diode 11c0, and the parasitic capacitances in the Zener diodes enabled by the later-described switch control in the Zener diode group 11c. When the voltage across both ends of a series circuit formed by the Zener diode 11c0 and the Zener diodes enabled in the Zener diode group 11c exceeds a forward voltage, a current flows through the parallel circuit of the capacitor 12a and the resistive element 12b. When the input voltage Vin is reduced to 0V, the current discharged from the parallel circuit of the capacitor 12a and the resistive element 12b to the input terminal side or the output terminal side is blocked by the Zener diode 11c0.

At this point, in order to compensate the electric charge accumulated in the capacitor 11a, a current flows from the output terminal side to the input terminal side, and the voltage on the output terminal side becomes negative. When the voltage at the output terminal is going to fall below a predetermined voltage on the negative side, the lower limit is limited by the sum of a Zener voltage (also referred to as a breakdown voltage) of the Zener diode 11c0 and the enabled Zener diodes, and the voltage on the negative side of the output terminal is determined.

For instance, when the switches swn1, ..., swni in the switch SWN connected to the Zener diode group 11c are turned on in that order, the number of enabled Zener diodes is decreased, and the Zener voltage of the overall Zener diode group 11c changes in a positive direction. Conversely, when the switches swn1, . . . , swni are turned off sequentially from the switch swni with the switches swn1, . . . , swni all ON, the number of enabled Zener diodes is increased, and the Zener voltage of the overall Zener diode group 11c increases in a negative direction.

Therefore, when the drain current decreases, the ADC 11d controls the switches swn1, . . . , swni to increase the number of enabled Zener diodes, thereby making it possible to increase the Zener voltage in a negative direction, and to cause the minimum voltage of the output voltage Vout to drop.

Since the threshold voltage of each Zener diode is low, the Zener diode group 11c does not significantly contribute to the control of the maximum voltage of the output voltage Vout.

In contrast, the Zener diode group 12c is connected in backward bias for the input, and determines the maximum voltage of the output voltage Vout inputted.

For instance, when the switches swp1, . . . , swpi in the switch SWP connected to the Zener diode group 12c are turned on in reverse order, the number of enabled Zener diodes is decreased, and the Zener voltage of the overall Zener diode group 12c decreases in a positive direction. Conversely, when the switches swn1, . . . , swni are turned off in that order from the switch swp1 with the switches swp1, . . . , swpi all ON, the number of enabled Zener diodes is increased, and the Zener voltage of the overall Zener diode group 12c increases in a negative direction.

Therefore, when the drain current decreases, the ADC 12d controls the switches swp1, . . . , swpi to increase the number of enabled Zener diodes, thereby increasing the Zener voltage in a negative direction. Since the connections in the Zener diode group 12c and the Zener diode group 11c are reversed, it is possible to cause the maximum voltage of the output voltage Vout to rise in this case.

Figure 5:
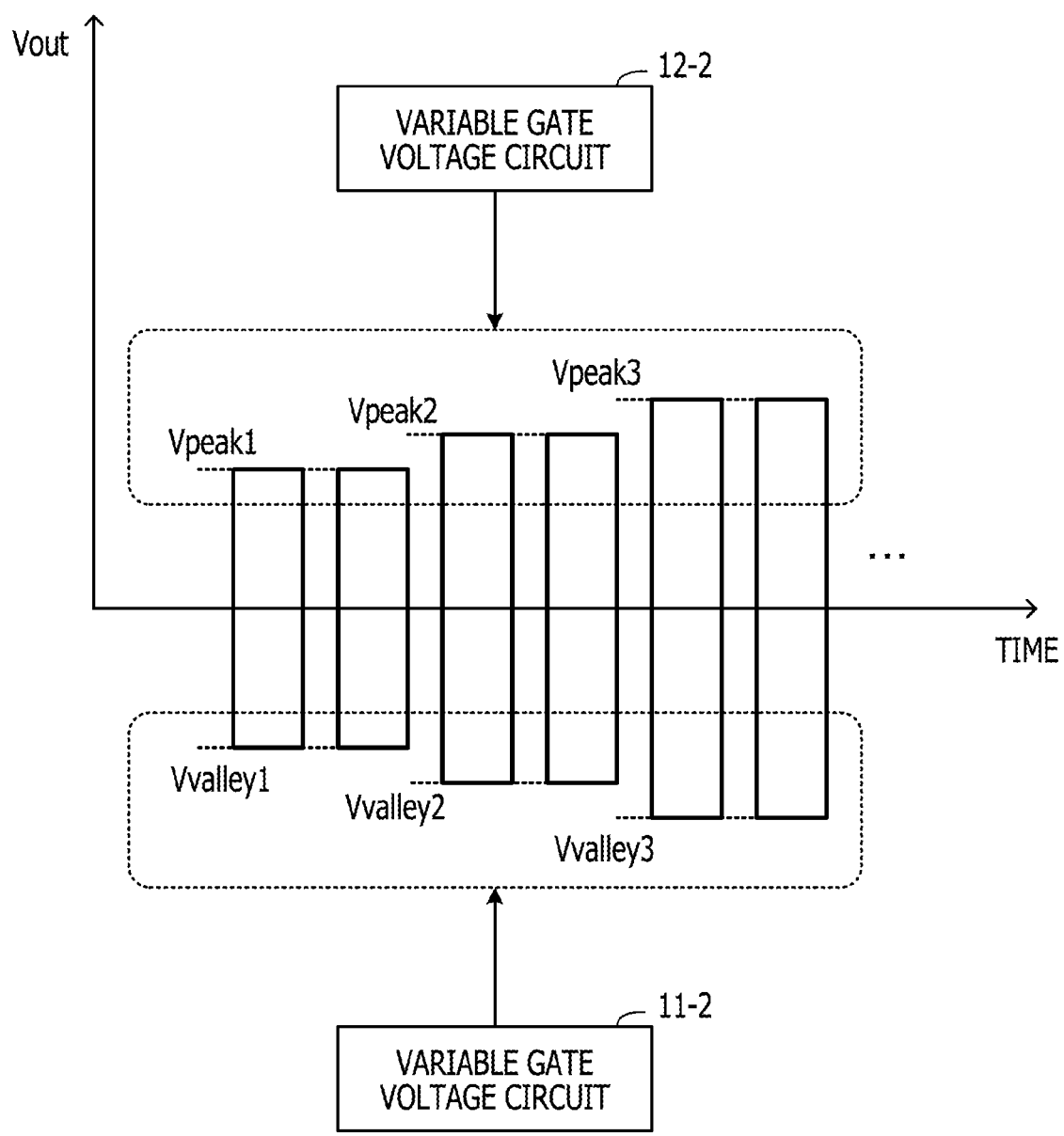
FIG. 5 is a graph illustrating an example of a voltage range of an output voltage determined by a variable gate voltage circuit.

FIG. 5 is a graph illustrating an example of a voltage range of an output voltage determined by a variable gate voltage circuit. The vertical axis indicates the output voltage Vout and the horizontal axis indicates time. The variable gate voltage circuit 11-2 controls the minimum voltage of the output voltage Vout based on the change in the drain current of the FET 1a.

In the example of FIG. 5, the variable gate voltage circuit 11-2 performs control to drop the minimum voltage of the output voltage Vout from a voltage Vvalley1 to a voltage Vvalley2, a voltage Vvalley2, a voltage Vvalley3 as the drain current of the FET 1a decreases.

The variable gate voltage circuit 12-2 controls the maximum voltage of the output voltage Vout based on the change in the drain current of the FET 1a. In the example of FIG. 5, the variable gate voltage circuit 12-2 performs control to rise the maximum voltage of the output voltage Vout from a voltage Vpeak1 to a voltage Vpeak2, from the voltage Vpeak2 to a voltage Vpeak3 as the drain current of the FET 1a decreases.

Figure 6:
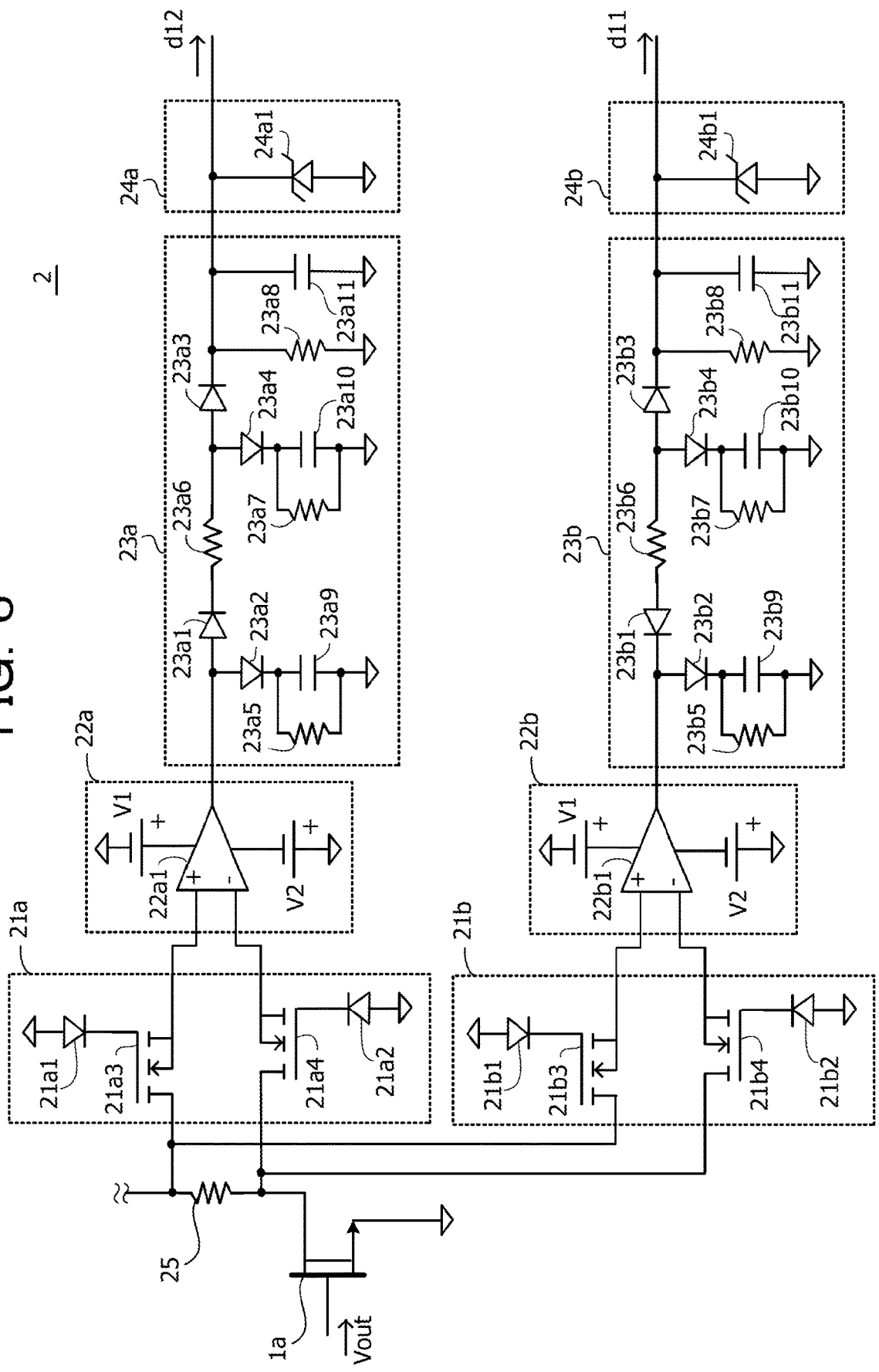
FIG. 6 is a diagram illustrating an example of a drain current monitoring circuit.

FIG. 6 is a diagram illustrating an example of a drain current monitoring circuit. The drain current monitoring circuit 2 includes clamp circuits 21a, 21b, amplification circuits 22a, 22b, a peak hold circuit 23a, a valley hold circuit 23b, protection circuits 24a, 24b, and a resistive element 25.

Since a high voltage is applied when the FET 1a is OFF, the clamp circuits 21a, 21b clamp the input potential so that an excess voltage is not applied to a circuit connected to a subsequent stage, and detect and output the voltage applied to the drain terminal when the FET 1a is in an ON state.

The amplification circuits 22a, 22b amplify the input signal. The peak hold circuit 23a holds the maximum value of the drain current. The valley hold circuit 23b holds the minimum value of the drain current. The protection circuits 24a, 24b perform overvoltage protection so that a voltage higher than a predetermined voltage is not applied to a circuit connected to a subsequent stage.

The clamp circuit 21a includes diodes 21a1, 21a2, and FETs 21a3, 21a4. The amplification circuit 22a includes an operational amplifier 22a1. The peak hold circuit 23a includes diodes 23a1, 23a2, 23a3, 23a4, resistive elements 23a5, 23a6, 23a7, 23a8, and capacitors 23a9, 23a10, 23a11. The protection circuit 24a includes a Zener diode 24a1.

The clamp circuit 21b includes diodes 21b1, 21b2, and FETs 21b3, 21b4. The amplification circuit 22b includes an operational amplifier 22b1. The valley hold circuit 23b includes diodes 23b1, 23b2, 23b3, 23b4, resistive elements 23b5, 23b6, 23b7, 23b8, and capacitors 23b9, 23b10, 23b11. The protection circuit 24b includes a Zener diode 24b1.

The connection relationship between the circuit elements is as follows.

One end of the resistive element 25 is connected to the drain terminal of the FET 21a3 and the drain terminal of the FET 21b3. The other end of the resistive element 25 is connected to the drain terminal of the FET 1a, the drain terminal of the FET 21a4, and the drain terminal of the FET 21b4.

The gate terminal of the FET 21a3 is connected to the cathode of diode 21a1, and the anode of the diode 21a1 is connected to the GND. The gate terminal of the FET 21a4 is connected to the cathode of the diode 21a2, and the anode of the diode 21a2 is connected to the GND.

The source terminal of the FET 21a3 is connected to the positive-side input terminal (+) of the operational amplifier 22a1, and the source terminal of the FET 21a4 is connected to the negative-side input terminal (−) of the operational amplifier 22a1. A positive-side power supply voltage V1 and a negative-side power supply voltage V2 are applied to the operational amplifier 22a1.

The output terminal of the operational amplifier 22a1 is connected to the anode of the diode 23a1 and the anode of the diode 23a2. The cathode of diode 23a2 is connected to one end of the capacitor 23a9 and one end of the resistive element 23a5, and the other end of the capacitor 23a9 and the other end of the resistive element 23a5 are connected to the GND.

The cathode of the diode 23a1 is connected to one end of the resistive element 23a6, and the other end of the resistive element 23a6 is connected to the anode of the diode 23a3 and the anode of the diode 23a4. The cathode of the diode 23a4 is connected to one end of the capacitor 23a10 and one end of resistive element 23a7, and the other end of the capacitor 23a10 and the other end of the resistive element 23a7 are connected to the GND.

The cathode of the diode 23a3 is connected to one end of the resistive element 23a8, one end of the capacitor 23a11, and the cathode of the Zener diode 24a1, from which the detected current signal dd12 is outputted. The other end of the resistive element 23a8, the other end of the capacitor 23a11, and the anode of the Zener diode 24a1 are connected to the GND.

The gate terminal of the FET 21b3 is connected to the cathode of the diode 21b1, and the anode of the diode 21b1 is connected to the GND. The gate terminal of the FET 21b4 is connected to the cathode of the diode 21b2, and the anode of diode 21b2 is connected to the GND.

The source terminal of the FET 21b3 is connected to the positive-side input terminal (+) of the operational amplifier 22b1, and the source terminal of FET 21b4 is connected to the negative-side input terminal (−) of the operational amplifier 22b1. The positive-side power supply voltage V1 and the negative-side power supply voltage V2 are applied to the operational amplifier 22b1.

The output terminal of the operational amplifier 22b1 is connected to the cathode of the diode 23b1, and the anode of the diode 23b2. The cathode of the diode 23b2 is connected to one end of the capacitor 23b9 and one end of the resistive element 23b5, and the other end of the capacitor 23b9 and the other end of the resistive element 23b5 are connected to the GND.

The anode of the diode 23b1 is connected to one end of the resistive element 23b6, and the other end of the resistive element 23b6 is connected to the anode of the diode 23b3 and the anode of the diode 23b4. The cathode of the diode 23b4 is connected to one end of the capacitor 23b10 and one end of the resistive element 23b7, and the other end of the capacitor 23b10 and the other end of the resistive element 23b7 are connected to the GND.

The cathode of the diode 23b3 is connected to one end of the resistive element 23b8, one end of the capacitor 23b11, and the cathode of the Zener diode 24b1, from which the detected current signal d11 is outputted. The other end of the resistive element 23b8, the other end of the capacitor 23b11, and the anode of the Zener diode 24b1 are connected to the GND.

Figure 7:
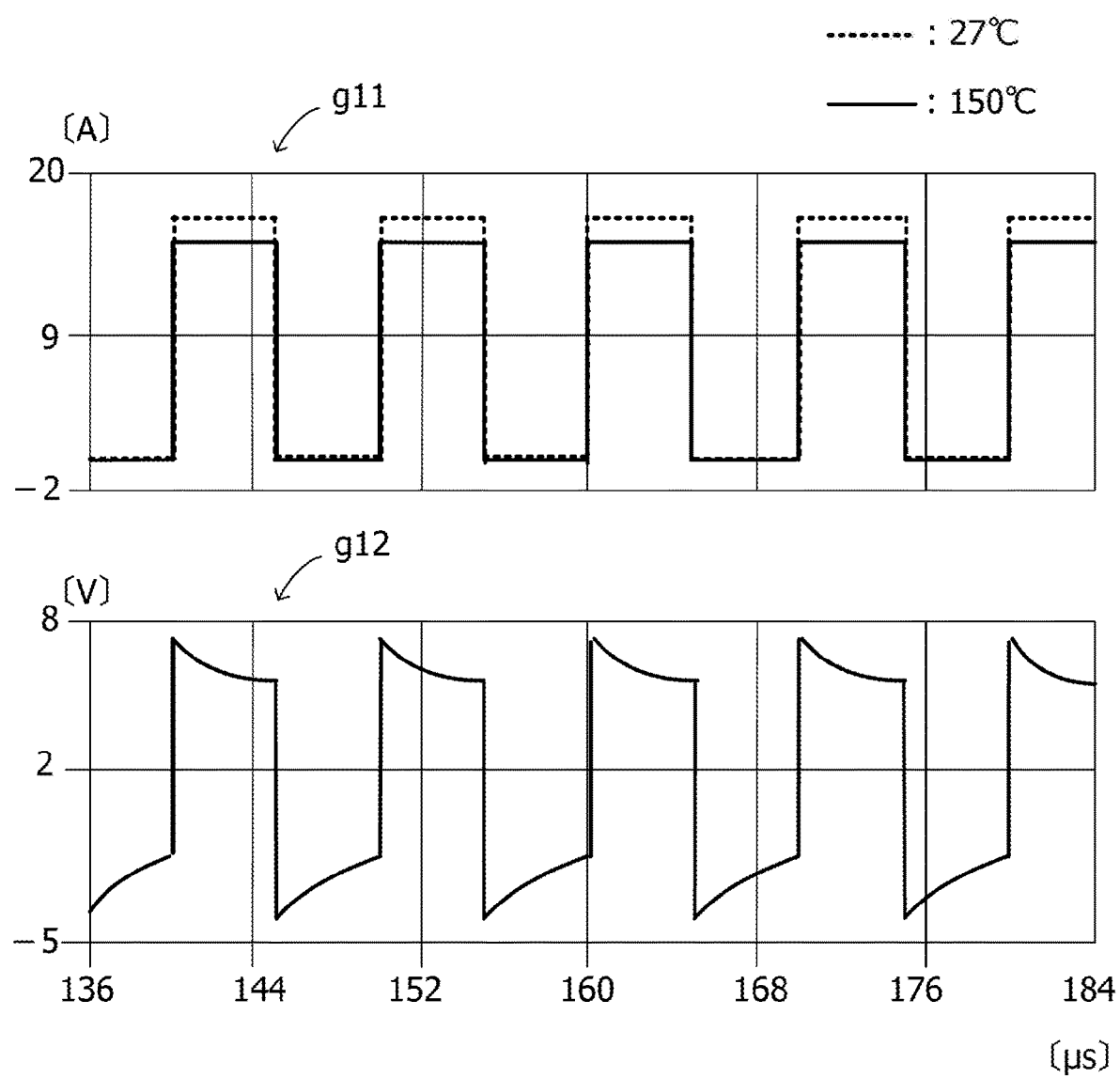
FIG. 7 is a graph illustrating an example of a simulation result (before measures are taken)

FIG. 7 is a graph illustrating an example of a simulation result. FIG. 7 illustrates a simulation result before the control by the waveform shaping circuit 1-2 is performed.

A waveform graph g11 is a waveform of the drain current. The vertical axis indicates drain current [A], and the horizontal axis indicates time [μs]. A waveform graph g12 is a waveform of the gate voltage. The vertical axis indicates gate voltage [V], and the horizontal axis indicates time [μs]. The dotted line waveform indicates the state when the ambient temperature is 27° C., and the solid line waveform indicates the state when the ambient temperature is 150° C.

When the temperature increases from 27° C. to 150° C., before the control by the waveform shaping circuit 1-2 is performed, the upper and lower limit voltages of the gate voltage do not change and are fixed. Thus, it is seen that when the temperature is 27° C., the peak value of the pulse-like drain current is near 18 A, but when the temperature increases to 150° C., the peak value of the pulse-like drain current is near 16 A.

Like this, the upper and lower limit voltages of the gate voltage are fixed before measures are taken, thus when the temperature increases, the drain current varies.

Figure 8:
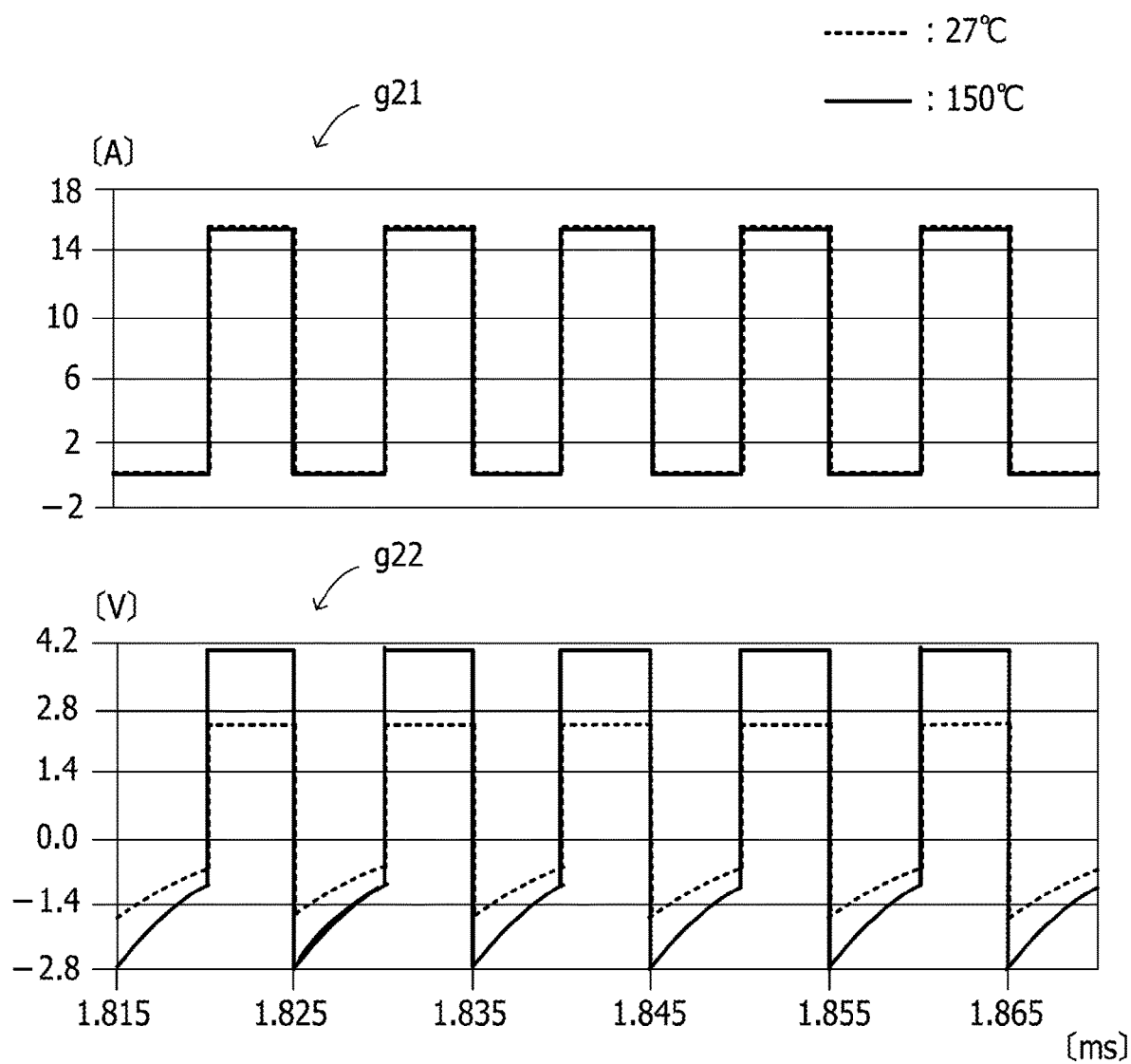
FIG. 8 is a graph illustrating an example of a simulation result (after measures are taken)

FIG. 8 is a graph illustrating an example of a simulation result. FIG. 8 illustrates a simulation result after the control by the waveform shaping circuit 1-2 is performed.

A waveform graph g21 is a waveform of the drain current. The vertical axis indicates drain current [A], and the horizontal axis indicates time [ms]. A waveform graph g22 is a waveform of the gate voltage. The vertical axis indicates gate voltage [V], and the horizontal axis indicates time [ms]. The dotted line waveform indicates the state when the ambient temperature is 27° C., and the solid line waveform indicates the state when the ambient temperature is 150° C.

When the temperature increases from 27° C. to 150° C., and the control by the waveform shaping circuit 1-2 is performed, the upper and lower limit voltages of the gate voltage are changed. Thus, when the temperature is 27° C., the peak value of the pulse-like drain current is near 16 A, and even when the temperature increases to 150° C., the peak value of the pulse-like drain current is still located near 16 A. For example, it is seen that the drain current is matched to the one before the temperature increase.

In this manner, in the waveform shaping circuit 1-2, the upper and lower limit voltages of the gate voltage are adaptively changed according to an increase of the temperature. Thus, even when the temperature increases, the drain current may be matched to the one before the temperature increase, and therefore, it is possible to reduce the variation in the current which flows through the FET.

(Example of Application of Waveform Shaping Circuit to Semiconductor Device)

Hereinafter, an example of application of the above-described waveform shaping circuit to a semiconductor device will be presented. A switching power supply device, a power factor correction (PFC) device, a power supply device for servers, and a DC booster device are presented below as examples of a semiconductor device.

Figure 9:
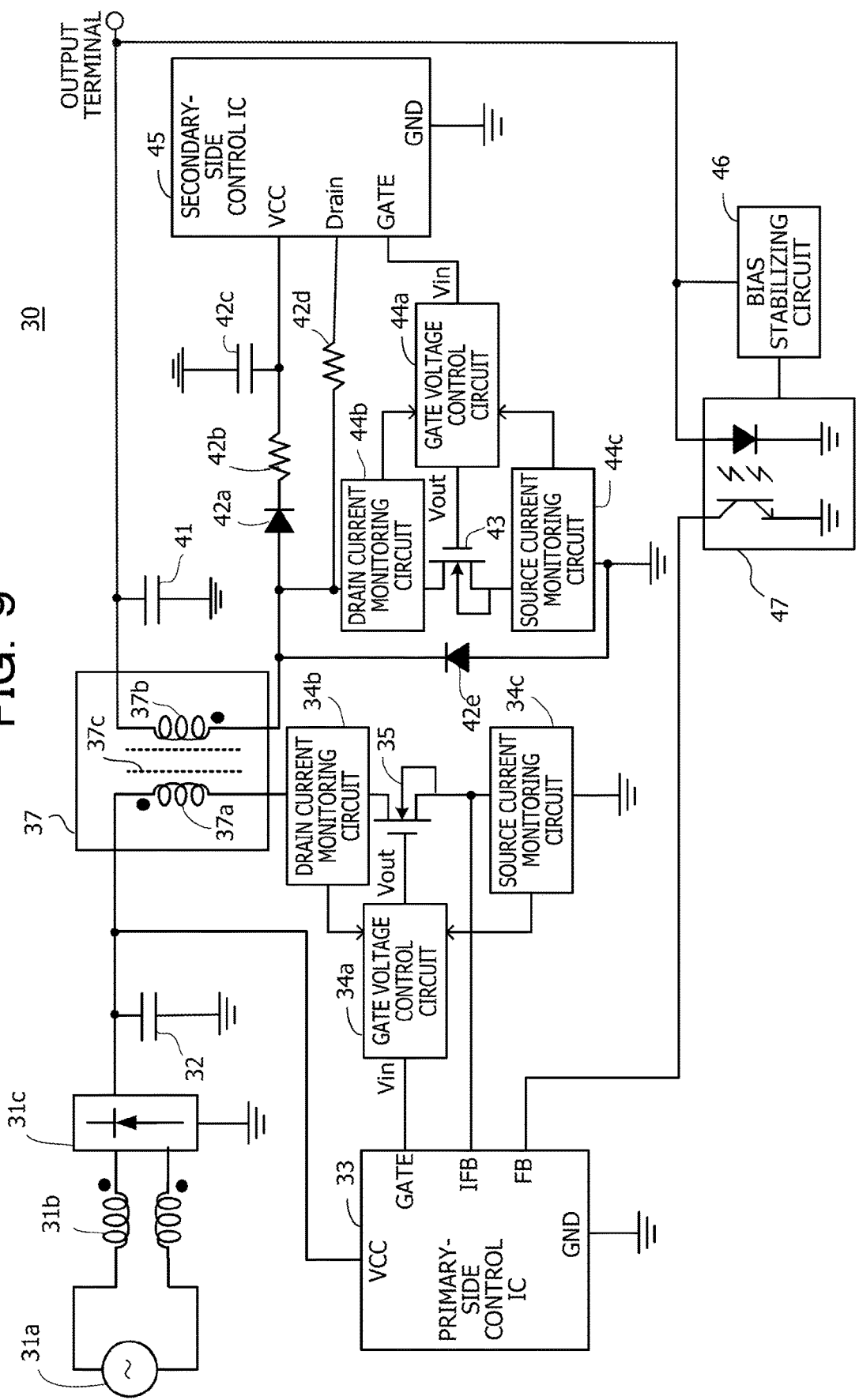
FIG. 9 is a diagram illustrating an example of a switching power supply device.

FIG. 9 is a diagram illustrating an example of a switching power supply device. A switching power supply device 30 is illustrated as an example of a semiconductor device to which the above-described waveform shaping circuit is applied. The switching power supply device 30 is usable as an AC adapter.

The primary-side circuit unit of the switching power supply device 30 includes a common mode filter 31b, a diode bridge 31c, a capacitor 32, a primary-side control IC 33, a gate voltage control circuit 34a, a drain current monitoring circuit 34b, a source current monitoring circuit 34c, and a transistor 35.

The gate voltage control circuit 34a, the drain current monitoring circuit 34b, and the source current monitoring circuit 34c are circuit components included in the waveform shaping circuit. Although FIG. 9 illustrates both the drain current monitoring circuit 34b and the source current monitoring circuit 34c, it is sufficient that one of the circuits be installed.

The switching power supply device 30 has a transformer 37 that provides electrical insulation as well as magnetic coupling between the primary-side circuit unit and a secondary-side circuit unit.

The secondary-side circuit unit includes capacitors 41, 42c, resistive elements 42b, 42d, diodes 42a, 42e, a transistor 43, a gate voltage control circuit 44a, a drain current monitoring circuit 44b, a source current monitoring circuit 44c, and a secondary-side control IC 45.

The gate voltage control circuit 44a, the drain current monitoring circuit 44b, and the source current monitoring circuit 44c are circuit components included in the waveform shaping circuit. Although FIG. 9 illustrates both the drain current monitoring circuit 44b and the source current monitoring circuit 44c, it is sufficient that one of the circuits be installed.

The switching power supply device 30 further has a bias stabilizing circuit 46 and a photocoupler 47. The transistors 35, 43 are an n-channel MOSFET, for instance, a GaN-HEMT.

The common mode filter 31b is connected to an AC power supply 31a to filter harmonic noise from the AC voltage. The diode bridge 31c rectifies the AC voltage with noise removed, and outputs a rectified signal. The capacitor 32 smooths the rectified signal outputted by the diode bridge 31c.

When the power supply voltage reaches an operable voltage, the primary-side control IC 33 outputs a control voltage (control signal) for controlling the switching operation of transistor 35. The primary-side control IC 33 has a VCC terminal, a GATE terminal, an IFB terminal, an FB terminal, and a GND terminal.

The VCC terminal is a terminal to which the power supply voltage of the primary-side control IC 33 is applied. The VCC terminal is connected to one end of the capacitor 32, the output terminal of the diode bridge 31c, and one end of a primary winding 37a of the transformer 37. The other end of the capacitor 32 is connected to the GND.

The GATE terminal is a terminal that outputs a control voltage for switching the transistor 35. The GATE terminal is connected to the input terminal of the gate voltage control circuit 34a.

The IFB terminal is a terminal for detecting feedback of a current which flows from the drain terminal to the source terminal of the transistor 35. The IFB terminal is connected to the source terminal of the transistor 35, and the input terminal of the source current monitoring circuit 34c. The source current monitoring circuit 34c is disposed between the source terminal of the transistor 35 and the GND, and outputs a result of monitoring the source current of the transistor 35 to the gate voltage control circuit 34a.

When the current inputted to the IFB terminal has an abnormal value, the primary-side control IC 33 controls, for instance, the control voltage outputted from the GATE terminal at a predetermined level, and stops the switching operation of the transistor 35 via the gate voltage control circuit 34a.

The FB terminal is a terminal that receives a feedback voltage outputted from the photocoupler 47. The primary-side control IC 33 adjusts the duty ratio to an appropriate value based on the feedback voltage so that the output voltage is maintained at a uniform level. The GND terminal is connected to the GND.

The drain current monitoring circuit 34b is disposed between the primary winding 37a of the transformer 37 and the drain terminal of the transistor 35, and outputs a result of monitoring the drain current of the transistor 35 to the gate voltage control circuit 34a.

The transistor 35 has a drain terminal connected to the primary winding 37a of the transformer 37 via the drain current monitoring circuit 34b, a source terminal connected to the GND via the source current monitoring circuit 34c, and a gate terminal to which the gate voltage outputted from the gate voltage control circuit 34a is applied. The transistor 35 is turned on or off according to the gate voltage supplied from the gate voltage control circuit 34a.

The gate voltage control circuit 34a receives a control voltage outputted from the primary-side control IC 33. The gate voltage control circuit 34a adaptively controls the upper and lower limits of the control voltage based on the detected current signal from the drain current monitoring circuit 34b or the detected current signal from the source current monitoring circuit 34c, and outputs a controlled voltage signal as the gate voltage.

The transformer 37 has the primary winding 37a, a secondary winding 37b, and a core 37c. Although schematically illustrated in FIG. 9, the primary winding 37a and the secondary winding 37b are wound around the core 37c. A black dot illustrated in the vicinity of one end of each winding indicates the position of start of winding of the winding.

One end of the primary winding 37a is connected to the output terminal of the diode bridge 31c, one end of the capacitor 32, and the VCC terminal of the primary side control IC 33, and the other end is connected to the drain terminal of the transistor 35 via the drain current monitoring circuit 34b.

One end of the secondary winding 37b is connected to one end of the capacitor 41, and the output terminal of the switching power supply device 30. The other end of the capacitor 41 is connected to the GND. The capacitor 41 is installed to reduce a ripple voltage generated in the output voltage.

The other end of the secondary winding 37b is connected to the anode of the diode 42a, one end of the resistive element 42d, and the cathode of the diode 42e, and is further connected to the drain terminal of the transistor 43 via the drain current monitoring circuit 44b.

The drain current monitoring circuit 44b is disposed between the primary winding 37b of the transformer 37 and the drain terminal of the transistor 43, and outputs a result of monitoring the drain current of the transistor 43 to the gate voltage control circuit 44a.

The transistor 43 has a drain terminal connected to the end of the secondary winding 37b via the drain current monitoring circuit 44b a source terminal connected to the GND via the source current monitoring circuit 44c, and a gate terminal to which the gate voltage supplied from the gate voltage control circuit 44a is applied. The transistor 43 performs switching operation based on the gate voltage.

The source current monitoring circuit 44c is disposed between the source terminal of the transistor 43 and the GND, and outputs a result of monitoring the source current of the transistor 43 to the gate voltage control circuit 44a. The secondary-side control IC 45 outputs a control voltage for controlling the switching operation of the transistor 43 based on the drain voltage of the transistor 43. The secondary-side control IC 45 has a VCC terminal, a drain terminal, a GATE terminal, and a GND terminal.

The VCC terminal is connected to one end of the capacitor 42c, and one end of the resistive element 42b. The other end of the capacitor 42c is connected to the GND, and the other end of the resistive element 42b is connected to the cathode of the diode 42a. A power supply voltage generated by the diode 42a, the resistive element 42b, and the capacitor 42c is applied to the VCC terminal, and the secondary-side control IC 45 operates using the power supply voltage.

The drain terminal is connected to one end of the secondary winding 37b via the resistive element 42d installed to detect the drain voltage of the transistor 43, and to the drain terminal of the transistor 43 via the drain current monitoring circuit 44b.

The GATE terminal is connected to the input terminal of the gate voltage control circuit 44a, and a control voltage is outputted from the GATE terminal. The GND is connected to the GND terminal.

The gate voltage control circuit 44a receives a control voltage outputted from the secondary-side control IC 45. The gate voltage control circuit 44a adaptively controls the upper and lower limits of the control voltage based on the detected current signal from the drain current monitoring circuit 44b or the detected current signal from the source current monitoring circuit 44c, and outputs a controlled voltage signal as the gate voltage.

The diode 42e has a function of performing rectification in a period until synchronous rectification by the switching operation of the transistor 43 starts. The anode of the diode 42e is connected to the GND, and further connected to the source terminal of the transistor 43 via the source current monitoring circuit 44c. The cathode of the diode 42e is connected to the drain terminal of the transistor 43 via the drain current monitoring circuit 44*b*.

The diode 42*a*, the resistive element 42*b*, and the capacitor 42*c* generate a power supply voltage which is a DC voltage for operating the secondary-side control IC 45.

The anode of the diode 42*a* is connected to one end of the secondary winding 37*b*, and the cathode of the diode 42*a* is connected to one end of the resistive element 42*b*. The other end of the resistive element 42*b* is connected to one end of the capacitor 42*c* and the VCC terminal of the secondary-side control IC 45.

The bias stabilizing circuit 46 performs stabilization of the bias of the output voltage, and generates a signal based on the input level of the photocoupler 47. The photocoupler 47 outputs an output signal from the bias stabilizing circuit 46 as an error signal indicating the error between the output voltage (DC voltage) of the switching power supply device 30 and an expected value. The primary-side control IC 33 receives the error signal as a feedback voltage of the output voltage, and adjusts the duty ratio to an appropriate value.

Figure 10:
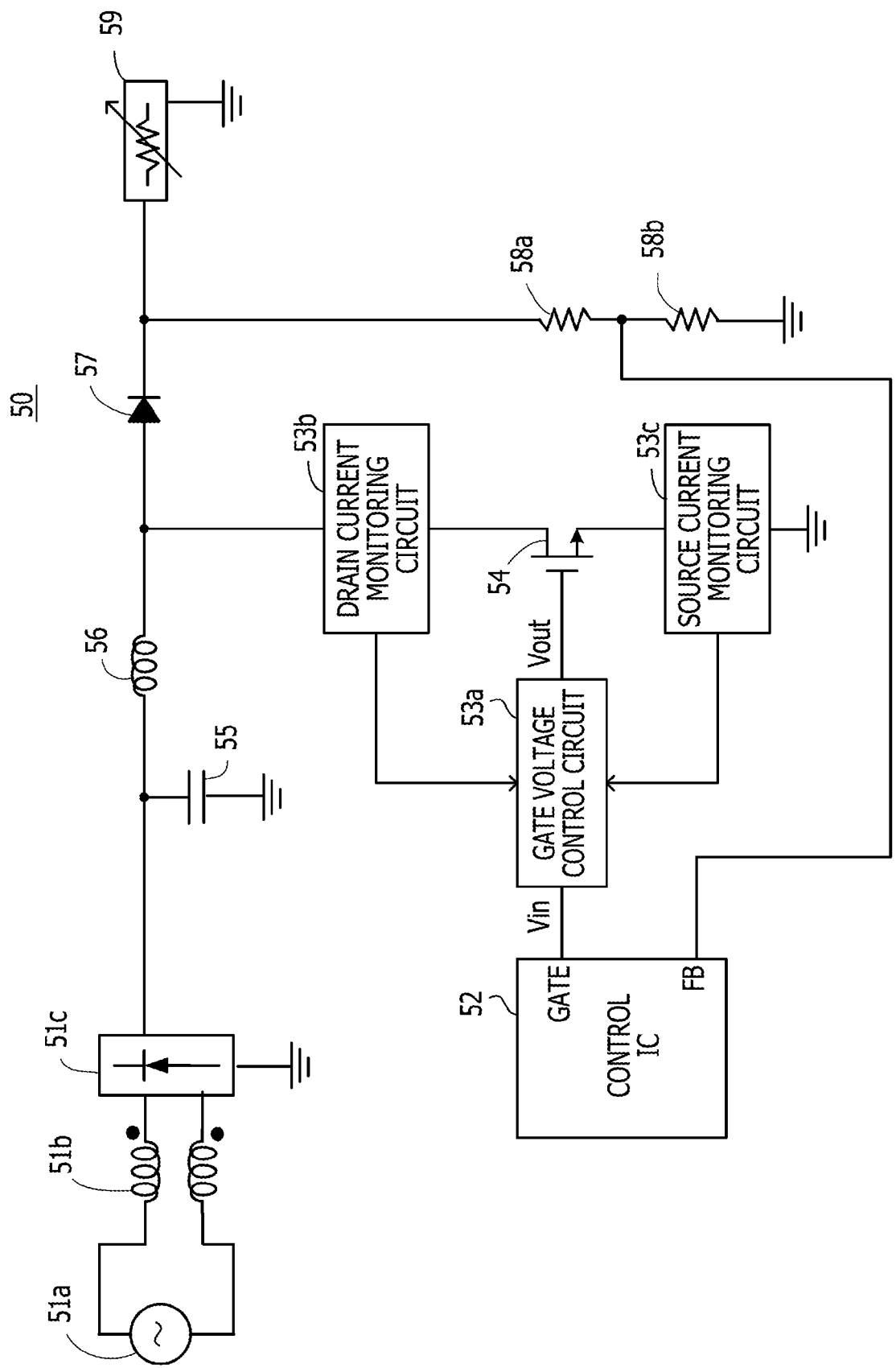
FIG. 10 is a diagram illustrating an example of a PFC device.

FIG. 10 is a diagram illustrating an example of a PFC device. The PFC device 50 aims to reduce harmonic from an AC power supply 51*a* to improve the power factor. The PFC device 50 includes a common mode filter 51*b*, a diode bridge 51*c*, a control IC 52, a gate voltage control circuit 53*a*, a drain current monitoring circuit 53*b*, a source current monitoring circuit 53*c*, a transistor 54, a capacitor 55, an inductor 56, a diode 57, resistive elements 58*a*, 58*b*, and a load 59. The transistor 54 is an n-channel MOS transistor, for instance, a GaN-HEMT.

The gate voltage control circuit 53*a*, the drain current monitoring circuit 53*b*, and the source current monitoring circuit 53*c* are circuit components included in the waveform shaping circuit. Although FIG. 10 illustrates both the drain current monitoring circuit 53*b* and the source current monitoring circuit 53*c*, it is sufficient that one of the circuits be installed.

In the connection relationship between the circuit elements, the AC power supply 51*a* is connected to the input side of the common mode filter 51*b*, and the input terminal of the diode bridge 51*c* is connected to the output side. The output terminal of the diode bridge 51*c* is connected to one end of the capacitor 55 and one end of the inductor 56. The other end of the capacitor 55 is connected to the GND.

The other end of the inductor 56 is connected to the drain terminal of the transistor 54 and the anode of the diode 57 via the drain current monitoring circuit 53*b*. The cathode of the diode 57 is connected to one end of the load 59 and one end of the resistive element 58*a*. The other end of the load 59 is connected to the GND.

The GATE terminal of the control IC 52 is connected to the input terminal of the gate voltage control circuit 53*a*. The output terminal of the gate voltage control circuit 53*a* is connected to the gate terminal of the transistor 54. The FB terminal of the control IC 52 is connected to the other end of the resistive element 58*a* and one end of the resistive element 58*b*, and the other end of the resistive element 58*b* is connected to the GND. The source terminal of the transistor 54 is connected to the GND via the source current monitoring circuit 53*c*.

The drain current monitoring circuit 53*b* is disposed between the drain terminal of the transistor 54 and a connection point between one end of the inductor 56 and the anode of the diode 57, and outputs a result of monitoring the drain current of the transistor 54 to the gate voltage control circuit 53*a*.

The source current monitoring circuit 53*c* is disposed between the source terminal of the transistor 54 and the GND, and outputs a result of monitoring the source current of the transistor 54 to the gate voltage control circuit 53*a*.

The gate voltage control circuit 53*a* receives a control voltage outputted from the control IC 52. The gate voltage control circuit 53*a* adaptively controls the upper and lower limits of the control voltage based on the detected current signal from the drain current monitoring circuit 53*b* or the detected current signal from the source current monitoring circuit 53*c*, and outputs a controlled voltage signal as the gate voltage.

The common mode filter 51*b* filters harmonic noise from the AC voltage from the AC power supply 51*a*. The diode bridge 51*c* rectifies the AC voltage with noise removed. The capacitor 55 smooths the rectified input voltage. The inductor 56 is a booster inductor that boosts the smoothed voltage to a predetermined value. A signal flowing through the inductor 56 flows in the diode 57 which rectifies the signal outputted from the inductor 56.

The control IC 52 has a GATE terminal and an FB terminal. The GATE terminal is a terminal that outputs a control voltage for switching the transistor 54. The FB terminal is a terminal that receives a feedback voltage in which the output voltage is divided by the resistive elements 58*a*, 58*b*. The control IC 52 adjusts the duty ratio to an appropriate value based on the feedback voltage so that the output voltage is maintained at a uniform level.

The transistor 54 performs switching operation based on the gate voltage outputted from the gate voltage control circuit 53*a*. When the transistor 54 is OFF, the signal outputted from the inductor 56 flows to the load 59 through the diode 57. When the transistor 54 is ON, the signal outputted from the inductor 56 flows to the GND via the source current monitoring circuit 53*c*.

Figure 11:
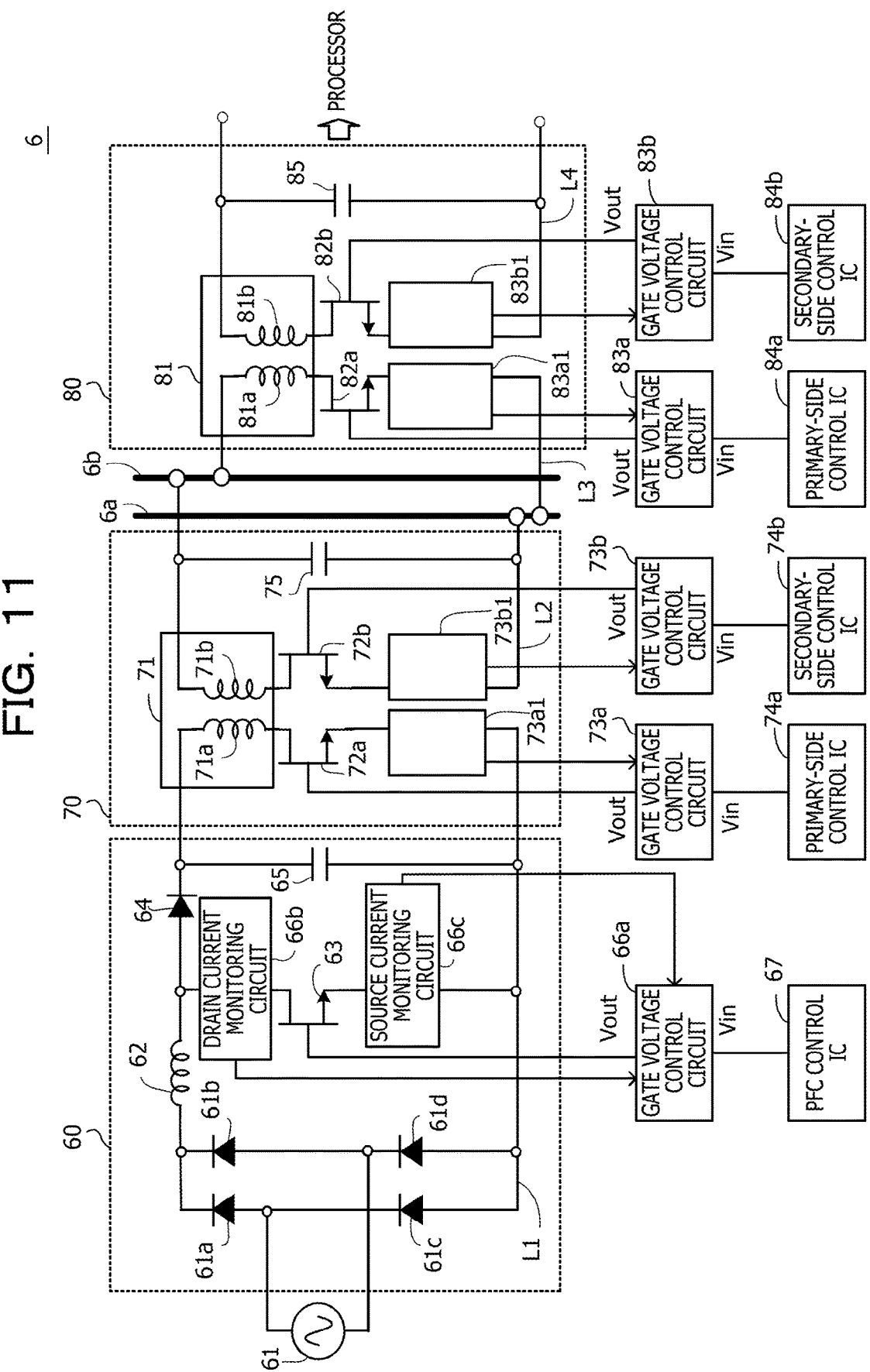
FIG. 11 is a diagram illustrating an example of a power supply device for servers.

FIG. 11 is a diagram illustrating an example of a power supply device for servers. A power supply device 6 for servers includes a PFC circuit 60, and insulation DC/DC converters 70, 80. The insulation DC/DC converter 70 and the insulation DC/DC converter 80 are coupled via buses (for instance, 12V bus) 6*a*, 6*b*.

The PFC circuit 60 includes diodes 61*a*, 61*b*, 61*c*, 61*d*, an inductor 62, a transistor 63, a diode 64, a capacitor 65, a drain current monitoring circuit 66*b*, and a source current monitoring circuit 66*c*. The diodes 61*a*, 61*b*, 61*c*, and 61*d* form a diode bridge. A gate voltage control circuit 66*a* and a PFC control IC 67 are disposed as a circuit that performs drive control of the transistor 63.

The gate voltage control circuit 66*a*, the drain current monitoring circuit 66*b*, and the source current monitoring circuit 66*c* are circuit components included in the waveform shaping circuit. Although FIG. 11 illustrates both the drain current monitoring circuit 66*b* and the source current monitoring circuit 66*c*, it is sufficient that one of the circuits be installed.

The insulation DC/DC converter 70 includes a transformer 71, transistors 72*a*, 72*b*, a capacitor 75, and source current monitoring circuits 73*a*1, 73*b*1. The transformer 71 includes a primary winding 71*a* and a secondary winding 71*b* (a core is not illustrated). A gate voltage control circuit 73*a* and a primary-side control IC 74*a* are disposed as a circuit which performs drive control of the transistor 72*a*, and a gate voltage control circuit 73*b* and a secondary-side control IC 74*b* are disposed as a circuit which performs drive control of the transistor 72*b*.

The gate voltage control circuit 73*a* and the source current monitoring circuit 73*a*1 are circuit components included in the waveform shaping circuit. Although the source current monitoring circuit 73a1 is installed in FIG. 11, the drain current monitoring circuit may be installed in the drain terminal of the transistor 72a.

The gate voltage control circuit 73b and the source current monitoring circuit 73b1 are circuit components included in the waveform shaping circuit. Although the source current monitoring circuit 73b1 is installed in FIG. 11, the drain current monitoring circuit may be installed in the drain terminal of the transistor 72b.

The insulation DC/DC converter 80 includes a transformer 81, transistors 82a, 82b, a capacitor 85, and source current monitoring circuits 83a1, 83b1. The transformer 81 includes a primary winding 81a and a secondary winding 81b (a core is not illustrated). A gate voltage control circuit 83a and a primary-side control IC 84a are disposed as a circuit which performs drive control of the transistor 82a, and a gate voltage control circuit 83b and a secondary-side control IC 84b are disposed as a circuit which performs drive control of the transistor 82b.

The gate voltage control circuit 83a and the source current monitoring circuit 83a1 are circuit components included in the waveform shaping circuit. Although the source current monitoring circuit 83a1 is installed in FIG. 11, the drain current monitoring circuit may be installed in the drain terminal of the transistor 82a.

The gate voltage control circuit 83b and the source current monitoring circuit 83b1 are circuit components included in the waveform shaping circuit. Although the source current monitoring circuit 83b1 is installed in FIG. 11, the drain current monitoring circuit may be installed in the drain terminal of the transistor 82b.

The transistors 63, 72a, 72b, 82a, 82b are each an NMOS transistor, for instance, a GaN-HEMT.

In the connection relationship between the circuit elements, one end of the AC power supply 61 is connected to the anode of the diode 61a and the cathode of the diode 61c. The other end of the AC power supply 61 is connected to the anode of the diode 61b and the cathode of the diode 61d.

The cathode of the diode 61a is connected to the cathode of the diode 61b and one end of the inductor 62. The other end of the inductor 62 is connected to the drain terminal of the transistor 63 and the anode of the diode 64 via the drain current monitoring circuit 66b. The cathode of the diode 64 is connected to one end of the capacitor 65, and one end of the primary winding 71a of the transformer 71. The other end of the primary winding 71a is connected to the drain terminal of the transistor 72a.

The anode of the diode 61c is connected to the source terminal of the transistor 63 via the anode of the diode 61d and the source current monitoring circuit 66c, and to the source terminal of the transistor 72a via the other end of the capacitor 65 and the source current monitoring circuit 73a1.

The gate terminal of the transistor 63 is connected to the output terminal of the gate voltage control circuit 66a, and the input terminal of the gate voltage control circuit 66a is connected to the output terminal of the PFC control IC 67.

One end of the secondary winding 71b of the transformer 71 is connected to one end of the capacitor 75 and a bus 6b. The other end of the secondary winding 71b is connected to the drain terminal of the transistor 72b. The source terminal of the transistor 72b is connected to the other end of the capacitor 75 and the bus 6a via the source current monitoring circuit 73b1.

The gate terminal of the transistor 72a is connected to the output terminal of the gate voltage control circuit 73a, and the input terminal of the gate voltage control circuit 73a is connected to the output terminal of the primary side control IC 74a. The gate terminal of the transistor 72b is connected to the output terminal of the gate voltage control circuit 73b, and the input terminal of the gate voltage control circuit 73b is connected to the output terminal of the secondary-side control IC 74b.

One end of the primary winding 81a of the transformer 81 is connected to the bus 6b, and the other end of the primary winding 81a is connected to the drain terminal of the transistor 82a. The source terminal of the transistor 82a is connected to the bus 6a via the source current monitoring circuit 83a1.

One end of the secondary winding 81b of the transformer 81 is connected to one end of the capacitor 85 and one end of the output terminal, and the other end of the secondary winding 81b is connected to the drain terminal of the transistor 82b. The source terminal of the transistor 82b is connected to the other end of the capacitor 85 and the other end of the output terminal via the source current monitoring circuit 83b1.

The gate terminal of the transistor 82a is connected to the output terminal of the gate voltage control circuit 83a, and the input terminal of the gate voltage control circuit 83a is connected to the output terminal of the primary side control IC 84a. The gate terminal of the transistor 82b is connected to the output terminal of the gate voltage control circuit 83b, and the input terminal of the gate voltage control circuit 83b is connected to the output terminal of the secondary-side control IC 84b.

The PFC circuit 60 attempts to reduce harmonic from the AC power supply 61 to improve the power factor. The PFC control IC 67 outputs a control voltage for switching transistor 63.

The drain current monitoring circuit 66b is disposed between the drain the terminal of transistor 63 and a connection point between one end of inductor 62 and the anode of the diode 64, and outputs a result of monitoring the drain current of the transistor 63 to the gate voltage control circuit 66a.

The source current monitoring circuit 66c is disposed between the source terminal of the transistor 63 and a line L1, and outputs a result of monitoring the source current of the transistor 63 to the gate voltage control circuit 66a. The line L1 is a wire connected to the anodes of the diodes 61c, 61d and one end of the capacitor 65.

The gate voltage control circuit 66a receives the control voltage outputted from the PFC control IC 67. The gate voltage control circuit 66a adaptively controls the upper and lower limits of the control voltage based on the detected current signal from the drain current monitoring circuit 66b or the detected current signal from the source current monitoring circuit 66c, and outputs a controlled voltage signal as the gate voltage.

The insulation DC/DC converter 70 aims to provide electrical insulation between the input side and the output side using the transformer 71, and converts a DC voltage outputted from the PFC circuit 60 to a predetermined DC voltage. The primary-side control IC 74a outputs a control voltage for switching the transistor 72a, and the secondary-side control IC 74b outputs a control voltage for switching the transistor 72b.

The source current monitoring circuit 73a1 is disposed between the source terminal of the transistor 72a and the line L1, and outputs a result of monitoring the source current of the transistor 72a to the gate voltage control circuit 73a.

The gate voltage control circuit 73a receives the control voltage outputted from the primary-control IC 74a. The gate voltage control circuit 73a adaptively controls the upper and lower limits of the control voltage based on the detected current signal from the source current monitoring circuit 73a1, and outputs a controlled voltage signal as the gate voltage.

The source current monitoring circuit 73b1 is disposed between the source terminal of the transistor 72b and a line L2, and outputs a result of monitoring the source current of the transistor 72b to the gate voltage control circuit 73b. The line L2 is a wire connected to one end of the capacitor 75 and the bus 6a.

The gate voltage control circuit 73b receives a control voltage outputted from the secondary-control IC 74b. The gate voltage control circuit 73b adaptively controls the upper and lower limits of the control voltage based on the detected current signal from the source current monitoring circuit 73b1, and outputs a controlled voltage signal as the gate voltage.

The insulation DC/DC converter 80 aims to provide electrical insulation between the input side and the output side using the transformer 81, and converts a DC voltage outputted from the insulation DC/DC converter 70 to a predetermined operation voltage of a processor such as a central processing unit (CPU). The primary-side control IC 84a outputs a control voltage for switching the transistor 82a, and the secondary-side control IC 84b outputs a control voltage for switching the transistor 82b.

The source current monitoring circuit 83a1 is disposed between the source terminal of the transistor 82a and a line L3, and outputs a result of monitoring the source current of the transistor 82a to the gate voltage control circuit 83a. The line L3 is a wire connected to the bus 6a.

The gate voltage control circuit 83a receives the control voltage outputted from the primary-side control IC 84a. The gate voltage control circuit 83a adaptively controls the upper and lower limits of the control voltage based on the detected current signal from the source current monitoring circuit 83a1, and outputs a controlled voltage signal as the gate voltage.

The source current monitoring circuit 83b1 is disposed between the source terminal of the transistor 82b and a line L4, and outputs a result of monitoring the source current of the transistor 82b to the gate voltage control circuit 83b. The line L4 is a negative electrode-side wire connected to one end of the capacitor 85 and one end of the output terminal.

The gate voltage control circuit 83b receives a control voltage outputted from the secondary-side control IC 84b. The gate voltage control circuit 83b adaptively controls the upper and lower limits of the control voltage based on the detected current signal from the source current monitoring circuit 83b1, and outputs a controlled voltage signal as the gate voltage.

Figure 12:
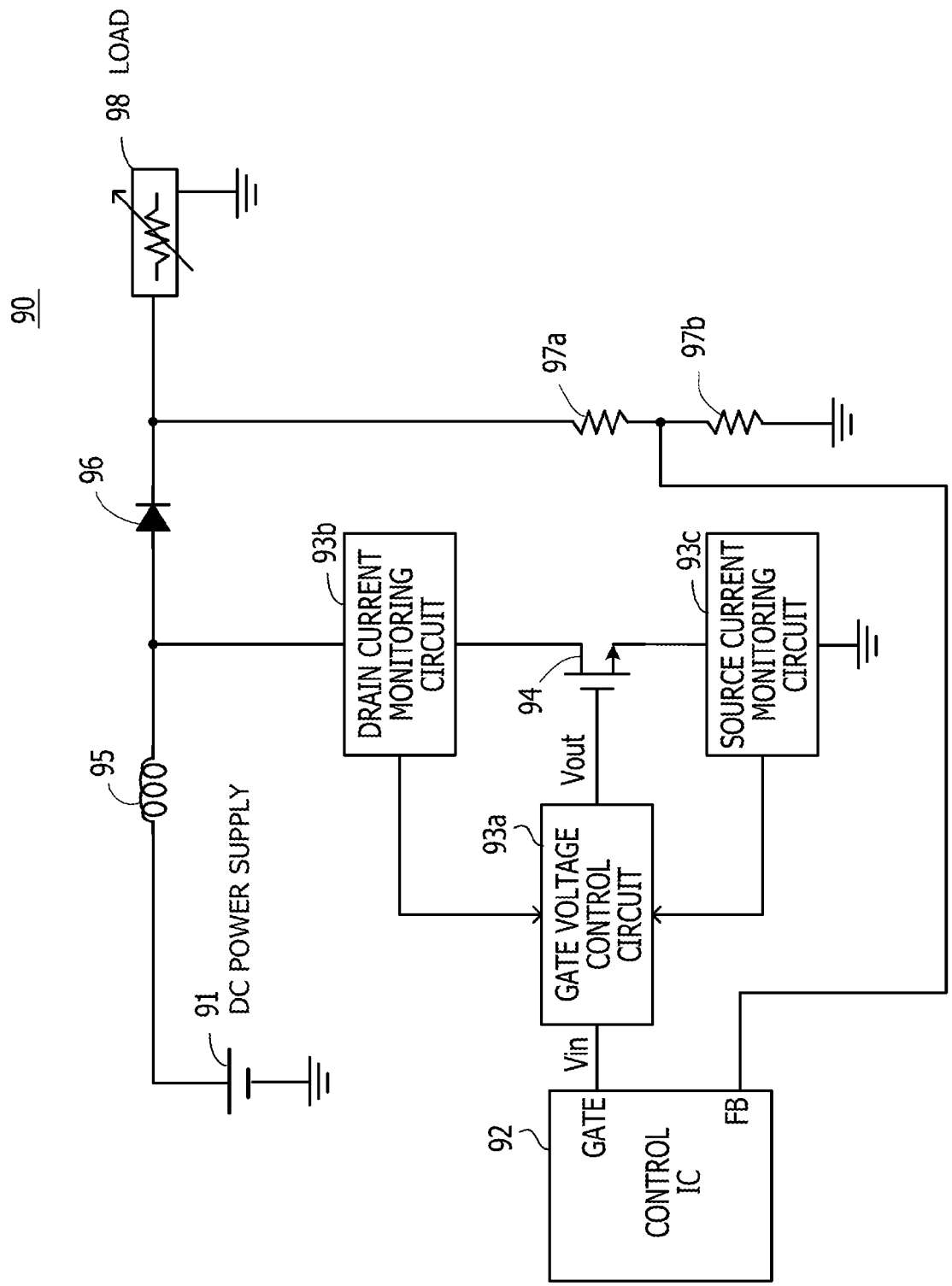
FIG. 12 is a diagram illustrating an example of a DC booster device.

FIG. 12 is a diagram illustrating an example of a DC booster device. A DC booster device 90 boosts the DC voltage outputted from a DC power supply 91. The DC booster device 90 includes a DC power supply 91, a control IC 92, a gate voltage control circuit 93a, a drain current monitoring circuit 93b, a source current monitoring circuit 93c, a transistor 94, an inductor 95, a diode 96, resistive elements 97a, 97b and a load 98. The transistor 94 is an NMOS transistor, for instance, a GaN-HEMT.

The gate voltage control circuit 93a, the drain current monitoring circuit 93b, and the source current monitoring circuit 93c are circuit components included in the waveform shaping circuit. Although FIG. 12 illustrates both the drain current monitoring circuit 93b and the source current monitoring circuit 93c, it is sufficient that one of the circuits be installed.

In the connection relationship between the circuit elements, the positive electrode terminal of the DC power supply 91 is connected to one end of inductor 95, and the negative electrode terminal of the DC power supply 91 is connected to the GND. The other end of the inductor 95 is connected to the drain terminal of the transistor 94 and the anode of the diode 96 via the drain current monitoring circuit 93b. The cathode of the diode 96 is connected to one end of the load 98 and one end of the resistive element 97a. The other end of the load 98 is connected to the GND.

The GATE terminal of the control IC 92 is connected to the input terminal of the gate voltage control circuit 93a. The output terminal of the gate voltage control circuit 93a is connected to the gate terminal of the transistor 94. An FB terminal of the control IC 92 is connected to the other end of the resistive element 97a and one end of the resistive element 97b and the other end of the resistive element 97b is connected to the GND. The source terminal of the transistor 94 is connected to the GND via the source current monitoring circuit 93c.

The drain current monitoring circuit 93b is disposed between the drain terminal of the transistor 94 and a connection point between one end of the inductor 95 and the anode of the diode 96, and outputs a result of monitoring the drain current of the transistor 94 to the gate voltage control circuit 93a.

The source current monitoring circuit 93c is disposed between the source terminal of the transistor 94 and the GND, and outputs a result of monitoring the source current of the transistor 94 to the gate voltage control circuit 93a.

The gate voltage control circuit 93a receives a control voltage outputted from the control IC 92. The gate voltage control circuit 93a adaptively controls the upper and lower limits of the control voltage based on the detected current signal from the drain current monitoring circuit 93b or the detected current signal from the source current monitoring circuit 93c, and outputs a controlled voltage signal as the gate voltage.

The inductor 95 is a booster inductor that boosts a DC voltage to a predetermined value. A signal flowing through the inductor 95 flows in the diode 96 which rectifies the signal outputted from the inductor 95.

The control IC 92 has a GATE terminal and an FB terminal. The GATE terminal is a terminal that outputs a control voltage for switching the transistor 94. The FB terminal is a terminal that receives a feedback voltage in which the output voltage is divided by the resistive elements 97a, 97b. The control IC 92 adjusts the duty ratio to an appropriate value based on the feedback voltage so that the output voltage is maintained at a uniform level.

The transistor 94 performs switching operation based on the gate voltage outputted from the gate voltage control circuit 93a. When the transistor 94 is OFF, the signal outputted from the inductor 95 flows to the load 98 through the diode 96. When the transistor 94 is ON, the signal outputted from the inductor 95 flows to the GND via the source current monitoring circuit 93c.

As described above, in the gate drive control of the FET, the waveform shaping circuits 1-1, 1-2 control the minimum voltage and the maximum voltage of a pulse voltage based on the drain current or the source current of the FET, the pulse voltage having a positive or negative value and being applied to the gate. Thus, it is possible to reduce the current variation which depends on the ambient temperature of the FET.

Although a case has been described above where the drain current is primarily monitored for a current flowing through the FET, the gate voltage may be controlled based on the source current detected by monitoring the source current.

When the source current is monitored, even if the gate structure of the FET is a MOS or metal insulator semiconductor (MIS) structure, or a diode structure, as long as the voltage applied to the gate terminal is lower than or equal to the forward voltage, the component of the gate current is basically negligible, and thus the same operation as in the drain current monitoring is performed. Clamp circuits are not used in the source current monitoring.

In contrast, when the gate structure of the FET is a PN diode structure or a Schottky diode structure, application of a voltage higher than or equal to the forward voltage of the diode causes both the drain current and gate current to flow, thus an error in the amount of control may occur. For this reason, when the gate structure of the FET is a PN diode structure or a Schottky diode structure, the drain current monitoring is suitable. Therefore, basically, drain current monitoring is preferable, in which no error in the amount of control occurs regardless of the gate structure of the FET.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A waveform shaping circuit comprising:
   a first variable gate voltage circuit configured to control a pulse signal to be applied to a gate of a field effect transistor, one unit of the pulse signal being formed by a first voltage level and a second voltage level, the first voltage level being less in voltage value than the second voltage level, the first voltage level being controlled by the first variable gate voltage circuit in accordance with a drain current or a source current of the field effect transistor; and
   a second variable gate voltage circuit configured to control the second voltage level of the pulse signal based on the drain current or the source current,
   the first variable gate voltage circuit includes:
      a first parallel circuit that includes a first capacitive element and a first resistive element coupled in parallel, a first terminal configured to be applied with an input voltage, and a second terminal electrically coupled to a gate terminal of the field effect transistor;
      a first Zener diode;
      one or a plurality of second Zener diodes coupled in series between the second terminal of the first parallel circuit and an anode of the first Zener diode;
      a plurality of first switches, each of which includes one end coupled to a cathode of one of the one or plurality of second Zener diodes, and the other end coupled to the second terminal; and
      a first switch control circuit configured to control ON and OFF of the plurality of first switches based on the drain current or the source current, and
   the second variable gate voltage circuit includes:
      a second parallel circuit that includes a second capacitative element and a second resistive element coupled in parallel, a third terminal configured to provide a reference potential, and a fourth terminal configured to be coupled to a cathode of the first Zener diode;
      a third Zener diode including an anode configured to provide the reference potential;
      one or a plurality of fourth Zener diodes coupled in series between the fourth terminal of the second parallel circuit and a cathode of the third Zener diode;
      a plurality of second switches, each of the plurality of second switches including one end and other end, the one end being coupled to a cathode of one of the one or plurality of fourth Zener diodes, the other end being configured to provide a reference potential; and
      a second switch control circuit configured to control ON and OFF of the plurality of second switches based on the drain current or the source current.

2. The waveform shaping circuit according to claim 1, wherein when the drain current or the source current decreases,
   the first variable gate voltage circuit causes the first voltage level to drop, and
   the second variable gate voltage circuit causes the second voltage level to rise.

3. A semiconductor device comprising:
   a field effect transistor; and
   a waveform shaping circuit that includes a first variable gate voltage circuit and a second variable gate voltage circuit, the first variable gate voltage circuit configured to control a pulse signal to be applied to a gate of the field effect transistor, one unit of the pulse signal being formed by a first voltage level and a second voltage level, the first voltage level being less in voltage value than the second voltage level, the first voltage level being controlled by the first variable gate voltage circuit in accordance with a drain current or a source current of the field effect transistor, the second variable gate voltage circuit configured to control the second voltage level of the pulse signal based on the drain current or the source current,
   the first variable gate voltage circuit includes:
      a first parallel circuit that includes a first capacitative element and a first resistive element coupled in parallel, a first terminal configured to be applied with an input voltage, and a second terminal electrically coupled to a gate terminal of the field effect transistor;
      a first Zener diode;
      one or a plurality of second Zener diodes coupled in series between the second terminal of the first parallel circuit and an anode of the first Zener diode;
      a plurality of first switches, each of which includes one end coupled to a cathode of one of the one or plurality of second Zener diodes, and the other end coupled to the second terminal; and
      a first switch control circuit configured to control ON and OFF of the plurality of first switches based on the drain current or the source current, and the second variable gate voltage circuit includes:
a second parallel circuit that includes a second capacitative element and a second resistive element coupled in parallel, a third terminal configured to provide a reference potential, and a fourth terminal configured to be coupled to a cathode of the first Zener diode;
a third Zener diode including an anode configured to provide the reference potential;
one or a plurality of fourth Zener diodes coupled in series between the fourth terminal of the second parallel circuit and a cathode of the third Zener diode;
a plurality of second switches, each of the plurality of second switches including one end and other end, the one end being coupled to a cathode of one of the one or plurality of fourth Zener diodes, the other end being configured to provide a reference potential; and
a second switch control circuit configured to control ON and OFF of the plurality of second switches based on the drain current or the source current.

4. A switching power supply device comprising:
a field effect transistor configured to perform a switching operation;
a control circuit configured to output a control signal which is a pulse voltage to be applied to a gate of the field effect transistor to control the switching operation of the field effect transistor, one unit of the control signal being formed by a first voltage level and a second voltage level, the first voltage level being less in voltage value than the second voltage level; and
a waveform shaping circuit including a first variable gate voltage circuit and a second variable gate voltage circuit, the first variable gate voltage circuit being configured to control the first voltage level of the control signal based on a drain current or a source current of the field effect transistor, the second variable gate voltage circuit being configured to control the second voltage level of the control signal based on the drain current or the source current, the first variable gate voltage circuit includes:
a first parallel circuit that includes a first capacitative element and a first resistive element coupled in parallel, a first terminal configured to be applied with an input voltage, and a second terminal electrically coupled to a gate terminal of the field effect transistor;
a first Zener diode;
one or a plurality of second Zener diodes coupled in series between the second terminal of the first parallel circuit and an anode of the first Zener diode;
a plurality of first switches, each of which includes one end coupled to a cathode of one of the one or plurality of second Zener diodes, and the other end coupled to the second terminal; and
a first switch control circuit configured to control ON and OFF of the plurality of first switches based on the drain current or the source current, and
the second variable gate voltage circuit includes:
a second parallel circuit that includes a second capacitative element and a second resistive element coupled in parallel, a third terminal configured to provide a reference potential, and a fourth terminal configured to be coupled to a cathode of the first Zener diode;
a third Zener diode including an anode configured to provide the reference potential;
one or a plurality of fourth Zener diodes coupled in series between the fourth terminal of the second parallel circuit and a cathode of the third Zener diode;
a plurality of second switches, each of the plurality of second switches including one end and other end, the one end being coupled to a cathode of one of the one or plurality of fourth Zener diodes, the other end being configured to provide a reference potential; and
a second switch control circuit configured to control ON and OFF of the plurality of second switches based on the drain current or the source current.

* * * * *